United States Patent
Kulik

(10) Patent No.: US 8,810,649 B2
(45) Date of Patent: Aug. 19, 2014

(54) NAVIGATION IN BUILDINGS WITH RECTANGULAR FLOOR PLAN

(75) Inventor: Victor Kulik, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 13/174,231

(22) Filed: Jun. 30, 2011

(65) Prior Publication Data

US 2013/0002857 A1 Jan. 3, 2013

(51) Int. Cl.
*H04N 7/18* (2006.01)

(52) U.S. Cl.
USPC ...................................................... 348/135

(58) Field of Classification Search
CPC ........ H04N 7/18; G01C 17/38; G01C 21/206; G01C 21/165; G01S 19/49; G01S 19/235
USPC ...................................................... 348/135
See application file for complete search history.

(56) References Cited

U.S. PATENT DOCUMENTS

| | | | | |
|---|---|---|---|---|
| 8,498,811 B2* | 7/2013 | Lundquist et al. | ............ | 701/434 |
| 8,515,578 B2* | 8/2013 | Chiappetta et al. | ............ | 700/253 |
| 2007/0192910 A1* | 8/2007 | Vu et al. | ............ | 901/17 |
| 2009/0177437 A1* | 7/2009 | Roumeliotis | ............ | 702/150 |
| 2012/0176491 A1* | 7/2012 | Garin et al. | ............ | 348/113 |

FOREIGN PATENT DOCUMENTS

WO WO2009021068 2/2009

OTHER PUBLICATIONS

International Search Report and Written Opinion—PCT/US2012/043160—ISA/EPO—Sep. 19, 2012.
Se S., et al., "Vision-based Mobile Robot Localization and Mapping using Scale-invariant Features". Proceedings of the 2001 IEEE International Conference on Robotics and Automation. ICRA 2001. Seoul. Korea. May 21-26, 2001; [Proceedings of the IEEE International Conference on Robotics and Automation]. New York. NY : IEEE. US. vol. 2, May 21, 2001. pp. 2051-2058. XP010550446.

\* cited by examiner

*Primary Examiner* — Jay Patel
*Assistant Examiner* — Francis G Geroleo
(74) *Attorney, Agent, or Firm* — Silicon Valley Patent Group LLP

(57) ABSTRACT

An apparatus and method for providing a direction based on an angle of a reference wall is provided. A mobile device uses an angle of a horizontal feature from an image to calibrate a sensor and future sensor measurements. The angle of the horizontal feature is determined by image processing and this angle is mapped to one of four assumed parallel or perpendicular angles of an interior of a building. A sensor correction value is determined from a difference between the sensor-determined angle and the image-processing determined angle. The image processing determined angle is assumed to be very accurate and without accumulated errors or offsets that the sensor measurements may contain.

21 Claims, 19 Drawing Sheets

| Label | Threshold |
|---|---|
| 400-11 | $45° - (90 - \theta_{TH}) + \theta_{EXTERIOR}$ |
| 400-12 | $45° + (90 - \theta_{TH}) + \theta_{EXTERIOR}$ |
| 400-13 | $135° - (90 - \theta_{TH}) + \theta_{EXTERIOR}$ |
| 400-14 | $135° + (90 - \theta_{TH}) + \theta_{EXTERIOR}$ |
| 400-15 | $225° - (90 - \theta_{TH}) + \theta_{EXTERIOR}$ |
| 400-16 | $225° + (90 - \theta_{TH}) + \theta_{EXTERIOR}$ |
| 400-17 | $315° - (90 - \theta_{TH}) + \theta_{EXTERIOR}$ |
| 400-18 | $315° + (90 - \theta_{TH}) + \theta_{EXTERIOR}$ |

NAVIGATION IN BUILDINGS WITH RECTANGULAR FLOOR PLAN

CROSS-REFERENCE TO RELATED APPLICATIONS

Not Applicable.

BACKGROUND

I. Field of the Invention

This disclosure relates generally to apparatus and methods for location estimation. More particularly, the disclosure relates to providing calibrated sensor measurements in a building or other structure when satellite navigation systems are unavailable or inadequate.

II. Background

Today, mobile devices having an ability to provide position estimates while in open areas are ubiquitous. In rural environment with a view of four or more positioning satellites, a mobile device acquires satellite signals and computes a position estimate based solely on these satellite signals. When in an urban environment or indoors, however, sufficient satellite signals are usually unobtainable. When adequate satellite signals are inaccessible, mobile devices often use signals from a cellular network to obtain a rough position estimate (e.g., via Cell IDs, trilateration, or triangulation). To improve position estimates when satellite and cellular signals are insufficient, a mobile device may use inertial sensors and dead reckoning. Over a long period, however, inertial sensors and conventional dead reckoning accumulate errors resulting in unreliable position estimates.

FIGS. 1 and 2 show an overhead view of a person with relation to a building. In FIG. 1, a person at a current location (marked with an 'x') walks along a path 120 with a mobile device 100 outside of three buildings 110. The Cardinal direction North 200 is shown in this overhead view as pointing up. The buildings 110 in this example complex are shown parallel or square with an exterior angle 210 ($\theta_{EXTERIOR}$) in line with a primary exterior wall of the buildings 110. That is, each exterior wall is parallel or perpendicular to the exterior angle 210 ($\theta_{EXTERIOR}$), which is shown at an angle ($\theta_N$) offset from North 200. While outside, the mobile device 100 is able to determine a position estimate from viewable satellites and/or cellular signals. Once inside, however, the mobile device 100 may not be able to receive adequate signals from either satellites or cellular base stations.

FIG. 2 shows a floor plan of an example building 110. The mobile device 100 continues along path 120 into building 110 and is shown currently in a hallway 130. Deep inside building 110, the mobile device 100 is unable to acquire satellite signals or perform satellite-based positioning or cellular-based positioning. In this situation, the mobile device 100 uses its sensor 330 (i.e., one or more accelerometer(s) 334 and/or gyrometer(s) 336 and/or magnetometer 338) to perform dead reckoning without a need for any signals from satellites or base stations. A gyrometer, such as gyrometer(s) 336, includes a gyroscope. Dead reckoning, however, accumulates error with each position estimate because of calibration errors in the sensor 330. Over time, such position estimates and estimated headings can accumulate so much error or drift that, instead of properly placing a mobile device 100 at a particular location, such estimates may improperly place the mobile device 100 in a different room or hallway, or even outside building 110 altogether. Therefore, dead reckoning and other applications using sensors 330 will benefit if the sensor 330 are kept well calibrated.

BRIEF SUMMARY

Disclosed is an apparatus and method for providing a navigational device that uses exterior walls as a reference, a navigational device that calibrated sensor measurements, and a navigation device that performs wall matching.

According to some aspects, disclosed is a method of navigation in a mobile device using a reference wall, the method comprising: determining a reference angle ($\theta_{REF}$) of the reference wall; capturing, with a camera in the mobile device, a local image containing a horizontal feature; processing the local image to determine a horizontal feature angle ($\theta_{HF}$), wherein the horizontal feature angle ($\theta_{HF}$) measures an angle from a current orientation of the mobile device to the horizontal feature; selecting a wall angle, of the horizontal feature, equal to an integer multiple of 90° from the reference angle ($\theta_{REF}$); and determining an angle of the current orientation of the mobile device based on a combination of the horizontal feature angle ($\theta_{HF}$) and the wall angle.

According to some aspects, disclosed is a method of calibrating an inertial sensor in a mobile device, the method comprising: capturing a first image, at a first time from the mobile device in a first orientation, wherein the first image contains a horizontal feature; determining a first horizontal feature angle ($\theta_{HF\_1}$) of the horizontal feature in the first image, wherein the first horizontal feature angle ($\theta_{HF\_1}$) is an angle from the mobile device in the first orientation at the first time to the horizontal feature in the first image; capturing a second image, at a second time from the mobile device in a second orientation, wherein the second image contains a horizontal feature; determining a second horizontal feature angle ($\theta_{HF\_2}$) of the horizontal feature in the second image, wherein the second horizontal feature angle ($\theta_{HF\_2}$) is an angle from the mobile device in the second orientation at the second time to the horizontal feature in the second image; computing a difference between the first horizontal feature angle ($\theta_{HF\_1}$) and the second horizontal feature angle ($\theta_{HF\_2}$) to form an optical sensor rotation; measuring, with the inertial sensor, a rotation of the mobile device from the first orientation at the first time to the second orientation at the second time to form an inertial sensor rotation; and deriving a sensor misalignment ($\theta_{ERROR}$) based on a difference between the optical sensor rotation and the inertial sensor rotation.

According to some aspects, disclosed is a method of navigation in a mobile device using a reference wall, the method comprising: determining a reference angle ($\theta_{REF}$) of the reference wall; determining an estimated direction of motion of the mobile device based on inertial sensor measurements; selecting a wall angle, closest to the estimated direction, equal to an integer multiple of 90° from the reference angle ($\theta_{REF}$); and determining a direction of motion of the mobile device based on the wall angle.

According to some aspects, disclosed is a method of navigation in a mobile device using a reference wall, the method comprising: capturing, with a camera in the mobile device, a local image containing a horizontal feature and the reference wall; determining a reference angle ($\theta_{REF}$) of the reference wall; processing the local image to determine a horizontal feature angle ($\theta_{HF}$), wherein the horizontal feature angle ($\theta_{HF}$) measures an angle from a current orientation of the mobile device to the horizontal feature; and determining an angle of the current orientation of the mobile device based on a combination of the horizontal feature angle ($\theta_{HF}$) and the reference angle ($\theta_{REF}$).

According to some aspects, disclosed is a method of providing calibrated inertial sensor measurements, the method comprising: determining a first reference angle ($\theta_{REF\_1}$); capturing, with a camera, a final image containing a horizontal feature from a first perspective; processing the final image to determine a first horizontal feature angle ($\theta_{HF\_1}$) of the horizontal feature; processing sensor measurements from an inertial sensor to form a sensor angle ($\theta_{SENSOR}$); computing a sensor misalignment ($\theta_{ERROR}$) based on: the sensor angle ($\theta_{SENSOR}$); the first reference angle ($\theta_{REF\_1}$); and the first horizontal feature angle ($\theta_{HF\_1}$); and correcting future sensor measurements from the sensor based on the sensor misalignment ($\theta_{ERROR}$).

According to some aspects, disclosed is a mobile device for navigation using a reference wall, the mobile device comprising: a camera; an inertial sensor; and a processor and memory comprising code for: determining a reference angle ($\theta_{REF}$) of the reference wall; capturing, with the camera in the mobile device, a local image containing a horizontal feature; processing the local image to determine a horizontal feature angle ($\theta_{HF}$), wherein the horizontal feature angle ($\theta_{HF}$) measures an angle from a current orientation of the mobile device to the horizontal feature; selecting a wall angle, of the horizontal feature, equal to an integer multiple of 90° from the reference angle ($\theta_{REF}$); and determining an angle of the current orientation of the mobile device based on a combination of the horizontal feature angle ($\theta_{HF}$) and the wall angle.

According to some aspects, disclosed is a mobile device for navigation using a reference wall, the mobile device comprising: means for determining a reference angle ($\theta_{REF}$) of the reference wall; means for capturing a local image containing a horizontal feature; means for processing the local image to determine a horizontal feature angle ($\theta_{HF}$), wherein the horizontal feature angle ($\theta_{HF}$) measures an angle from a current orientation of the mobile device to the horizontal feature; means for selecting a wall angle, of the horizontal feature, equal to an integer multiple of 90° from the reference angle ($\theta_{REF}$); and means for determining an angle of the current orientation of the mobile device based on a combination of the horizontal feature angle ($\theta_{HF}$) and the wall angle.

According to some aspects, disclosed is a non-transient computer-readable storage medium including program code stored thereon, for navigation using a reference wall, comprising program code for: determining a reference angle ($\theta_{REF}$) of the reference wall; receiving, from a camera in the mobile device, a local image containing a horizontal feature; processing the local image to determine a horizontal feature angle ($\theta_{HF}$), wherein the horizontal feature angle ($\theta_{HF}$) measures an angle from a current orientation of the mobile device to the horizontal feature; selecting a wall angle, of the horizontal feature, equal to an integer multiple of 90° from the reference angle ($\theta_{REF}$); and determining an angle of the current orientation of the mobile device based on a combination of the horizontal feature angle ($\theta_{HF}$) and the wall angle.

According to some aspects, disclosed is a mobile device for navigation using wall matching with a horizontal feature to estimate motion, the mobile device comprising: a camera; an inertial sensor; and a processor and memory comprising code for: capturing, with the camera in the mobile device, a local image containing the horizontal feature; processing the local image to determine a horizontal feature angle ($\theta_{HF}$), wherein the horizontal feature angle ($\theta_{HF}$) is an angle from a current orientation of the mobile device to the horizontal feature; and estimating a direction of motion of the mobile device, based on the horizontal feature angle ($\theta_{HF}$), as parallel to a wall angle of the horizontal feature.

According to some aspects, disclosed is a mobile device for navigation using wall matching with a horizontal feature to estimate motion, the mobile device comprising: means for capturing a local image containing the horizontal feature; means for processing the local image to determine a horizontal feature angle ($\theta_{HF}$), wherein the horizontal feature angle ($\theta_{HF}$) is an angle from a current orientation of the mobile device to the horizontal feature; and means for estimating a direction of motion of the mobile device, based on the horizontal feature angle ($\theta_{HF}$), as parallel to a wall angle of the horizontal feature.

According to some aspects, disclosed is a non-transient computer-readable storage medium including program code stored thereon, navigation using wall matching with a horizontal feature to estimate motion, comprising program code for: receiving, from a camera in the mobile device, a local image containing the horizontal feature; processing the local image to determine a horizontal feature angle ($\theta_{HF}$), wherein the horizontal feature angle ($\theta_{HF}$) is an angle from a current orientation of the mobile device to the horizontal feature; and estimating a direction of motion of the mobile device, based on the horizontal feature angle ($\theta_{HF}$), as parallel to a wall angle of the horizontal feature.

According to some aspects, disclosed is a mobile device for calibrating an inertial sensor, the mobile device comprising: a camera; the inertial sensor; and a processor and memory comprising code for: capturing a first image, at a first time from the mobile device in a first orientation, wherein the first image contains a horizontal feature; determining a first horizontal feature angle ($\theta_{HF\_1}$) of the horizontal feature in the first image, wherein the first horizontal feature angle ($\theta_{HF\_1}$) is an angle from the mobile device in the first orientation at the first time to the horizontal feature in the first image; capturing a second image, at a second time from the mobile device in a second orientation, wherein the second image contains a horizontal feature; determining a second horizontal feature angle ($\theta_{HF\_2}$) of the horizontal feature in the second image, wherein the second horizontal feature angle ($\theta_{HF\_2}$) is an angle from the mobile device in the second orientation at the second time to the horizontal feature in the second image; computing a difference between the first horizontal feature angle ($\theta_{HF\_1}$) and the second horizontal feature angle ($\theta_{HF\_2}$) to form an optical sensor rotation; measuring, with the inertial sensor, a rotation of the mobile device from the first orientation at the first time to the second orientation at the second time to form an inertial sensor rotation; and deriving a sensor misalignment ($\theta_{ERROR}$) based on a difference between the optical sensor rotation and the inertial sensor rotation.

According to some aspects, disclosed is a mobile device for calibrating an inertial sensor, the mobile device comprising: means for capturing a first image, at a first time from the mobile device in a first orientation, wherein the first image contains a horizontal feature; means for determining a first horizontal feature angle ($\theta_{HF\_1}$) of the horizontal feature in the first image, wherein the first horizontal feature angle ($\theta_{HF\_1}$) is an angle from the mobile device in the first orientation at the first time to the horizontal feature in the first image; means for capturing a second image, at a second time from the mobile device in a second orientation, wherein the second image contains a horizontal feature; means for determining a second horizontal feature angle ($\theta_{HF\_2}$) of the horizontal feature in the second image, wherein the second horizontal feature angle ($\theta_{HF\_2}$) is an angle from the mobile device in the second orientation at the second time to the horizontal feature in the second image; means for computing a difference between the first horizontal feature angle ($\theta_{HF\_1}$) and the second horizontal feature angle ($\theta_{HF\_2}$) to form an optical sensor rotation; means for measuring, with the inertial sensor, a rotation of the mobile device from the first orientation at the first time to the second orientation at the second time to form an inertial sensor rotation; and means for deriving a sensor misalignment ($\theta_{ERROR}$) based on a difference between the optical sensor rotation and the inertial sensor rotation.

According to some aspects, disclosed is a non-transient computer-readable storage medium including program code stored thereon, for calibrating an inertial sensor, comprising program code for: capturing a first image, at a first time from the mobile device in a first orientation, wherein the first image contains a horizontal feature; determining a first horizontal feature angle ($\theta_{HF\_1}$) of the horizontal feature in the first image, wherein the first horizontal feature angle ($\theta_{HF\_1}$) is an angle from the mobile device in the first orientation at the first time to the horizontal feature in the first image; capturing a second image, at a second time from the mobile device in a second orientation, wherein the second image contains a horizontal feature; determining a second horizontal feature angle ($\theta_{HF\_2}$) of the horizontal feature in the second image, wherein the second horizontal feature angle ($\theta_{HF\_2}$) is an angle from the mobile device in the second orientation at the second time to the horizontal feature in the second image; computing a difference between the first horizontal feature angle ($\theta_{HF\_1}$) and the second horizontal feature angle ($\theta_{HF\_2}$) to form an optical sensor rotation; measuring, with the inertial sensor, a rotation of the mobile device from the first orientation at the first time to the second orientation at the second time to form an inertial sensor rotation; and deriving a sensor misalignment ($\theta_{ERROR}$) based on a difference between the optical sensor rotation and the inertial sensor rotation.

According to some aspects, disclosed is a mobile device for navigation using a reference wall, the mobile device comprising: an inertial sensor; and a processor and memory comprising code for: determining a reference angle ($\theta_{REF}$) of the reference wall; determining an estimated direction of motion of the mobile device based on inertial sensor measurements from the inertial sensor; selecting a wall angle, closest to the estimated direction, equal to an integer multiple of 90° from the reference angle ($\theta_{REF}$); and determining a direction of motion of the mobile device based on the wall angle.

According to some aspects, disclosed is a mobile device for navigation using a reference wall, the mobile device comprising: means for determining a reference angle ($\theta_{REF}$) of the reference wall; means for determining an estimated direction of motion of the mobile device based on inertial sensor measurements; means for selecting a wall angle, closest to the estimated direction, equal to an integer multiple of 90° from the reference angle ($\theta_{REF}$); and means for determining a direction of motion of the mobile device based on the wall angle.

According to some aspects, disclosed is a non-transient computer-readable storage medium including program code stored thereon, for navigation using a reference wall, comprising program code for: determining a reference angle ($\theta_{REF}$) of the reference wall; determining an estimated direction of motion of the mobile device based on inertial sensor measurements; selecting a wall angle, closest to the estimated direction, equal to an integer multiple of 90° from the reference angle ($\theta_{REF}$); and determining a direction of motion of the mobile device based on the wall angle.

According to some aspects, disclosed is a mobile device for navigation using a reference wall, the mobile device comprising: a camera; an inertial sensor; and a processor and memory comprising code for: capturing, with the camera in the mobile device, a local image containing a horizontal feature and the reference wall; determining a reference angle ($\theta_{REF}$) of the reference wall; processing the local image to determine a horizontal feature angle ($\theta_{HF}$), wherein the horizontal feature angle ($\theta_{HF}$) measures an angle from a current orientation of the mobile device to the horizontal feature; and determining an angle of the current orientation of the mobile device based on a combination of the horizontal feature angle ($\theta_{HF}$) and the reference angle ($\theta_{REF}$).

According to some aspects, disclosed is a mobile device for navigation using a reference wall, the mobile device comprising: means for capturing a local image containing a horizontal feature and the reference wall; means for determining a reference angle ($\theta_{REF}$) of the reference wall; means for processing the local image to determine a horizontal feature angle ($\theta_{HF}$), wherein the horizontal feature angle ($\theta_{HF}$) measures an angle from a current orientation of the mobile device to the horizontal feature; and means for determining an angle of the current orientation of the mobile device based on a combination of the horizontal feature angle ($\theta_{HF}$) and the reference angle ($\theta_{REF}$).

According to some aspects, disclosed is a non-transient computer-readable storage medium including program code stored thereon, for navigation in a mobile device using a reference wall, comprising program code for: receiving, from a camera in the mobile device, a local image containing a horizontal feature and the reference wall; determining a reference angle ($\theta_{REF}$) of the reference wall; processing the local image to determine a horizontal feature angle ($\theta_{HF}$), wherein the horizontal feature angle ($\theta_{HF}$) measures an angle from a current orientation of the mobile device to the horizontal feature; and determining an angle of the current orientation of the mobile device based on a combination of the horizontal feature angle ($\theta_{HF}$) and the reference angle ($\theta_{REF}$).

According to some aspects, disclosed is a mobile device for providing calibrated inertial sensor measurements, the mobile device comprising: a camera; an inertial sensor; and a processor and memory comprising code for: determining a first reference angle ($\theta_{REF\_1}$); capturing, with the camera, a final image containing a horizontal feature from a first perspective; processing the final image to determine a first horizontal feature angle ($\theta_{HF\_1}$) of the horizontal feature; processing sensor measurements from the inertial sensor to form a sensor angle ($\theta_{SENSOR}$); computing a sensor misalignment ($\theta_{ERROR}$) based on: the sensor angle ($\theta_{SENSOR}$); the first reference angle ($\theta_{REF\_1}$); and the first horizontal feature angle ($\theta_{HF\_1}$); and correcting future sensor measurements from the sensor based on the sensor misalignment ($\theta_{ERROR}$).

According to some aspects, disclosed is a mobile device for providing calibrated inertial sensor measurements, the mobile device comprising: means for determining a first reference angle ($\theta_{REF\_1}$); means for capturing a final image containing a horizontal feature from a first perspective; means for processing the final image to determine a first horizontal feature angle ($\theta_{HF\_1}$) of the horizontal feature; means for processing sensor measurements from the inertial sensor to form a sensor angle ($\theta_{SENSOR}$); means for computing a sensor misalignment ($\theta_{ERROR}$) based on: the sensor angle ($\theta_{SENSOR}$); the first reference angle ($\theta_{REF\_1}$); and the first horizontal feature angle ($\theta_{HF\_1}$); and means for correcting future sensor measurements from the sensor based on the sensor misalignment ($\theta_{ERROR}$).

According to some aspects, disclosed is a non-transient computer-readable storage medium including program code stored thereon, for providing calibrated inertial sensor measurements, comprising program code for: determining a first reference angle ($\theta_{REF\_1}$); capturing, with a camera, a final image containing a horizontal feature from a first perspective;

processing the final image to determine a first horizontal feature angle ($\theta_{HF\_1}$) of the horizontal feature; processing sensor measurements from the inertial sensor to form a sensor angle ($\theta_{SENSOR}$); computing a sensor misalignment ($\theta_{ERROR}$) based on: the sensor angle ($\theta_{SENSOR}$); the first reference angle ($\theta_{REF\_1}$); and the first horizontal feature angle ($\theta_{HF\_1}$); and correcting future sensor measurements from the sensor based on the sensor misalignment ($\theta_{ERROR}$).

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

Figure 1:
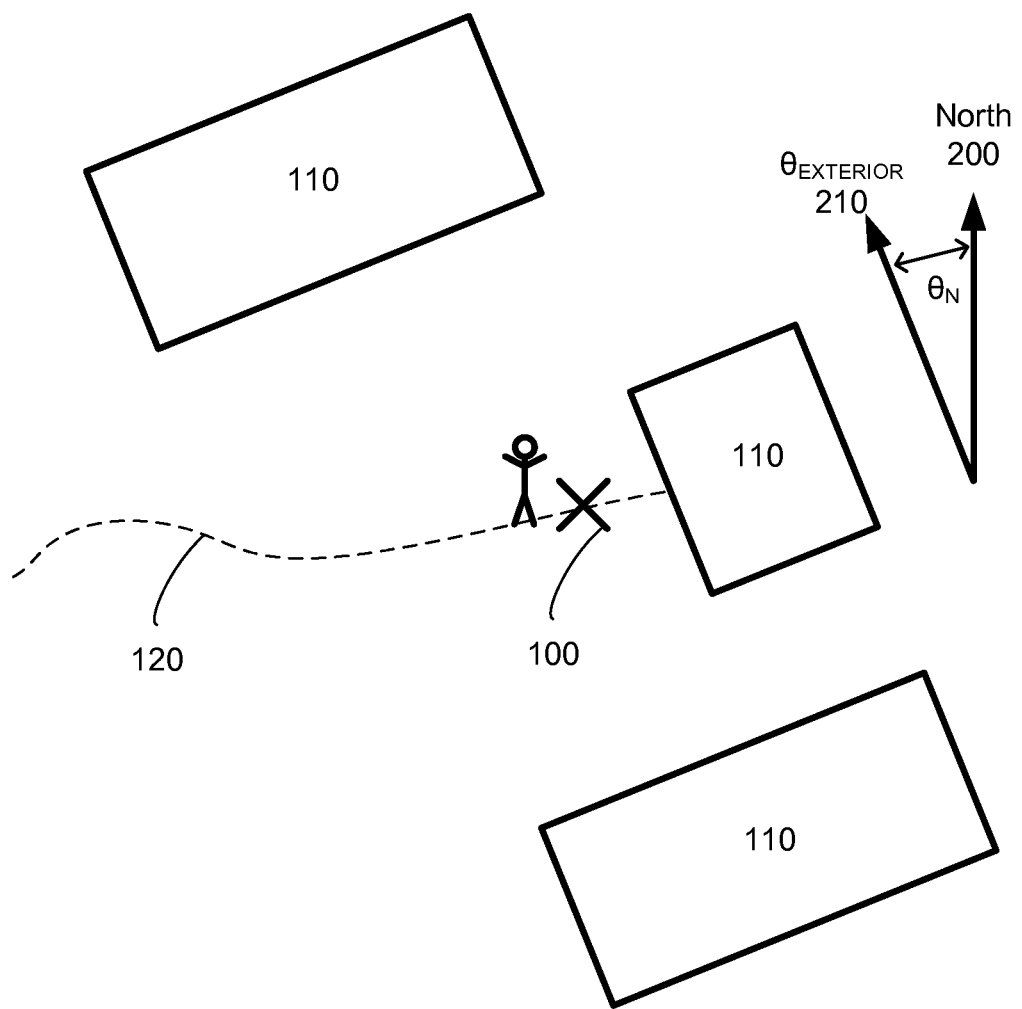
FIGS. 1 and 2 show an overhead view of a person with relation to a building.
Figure 2:
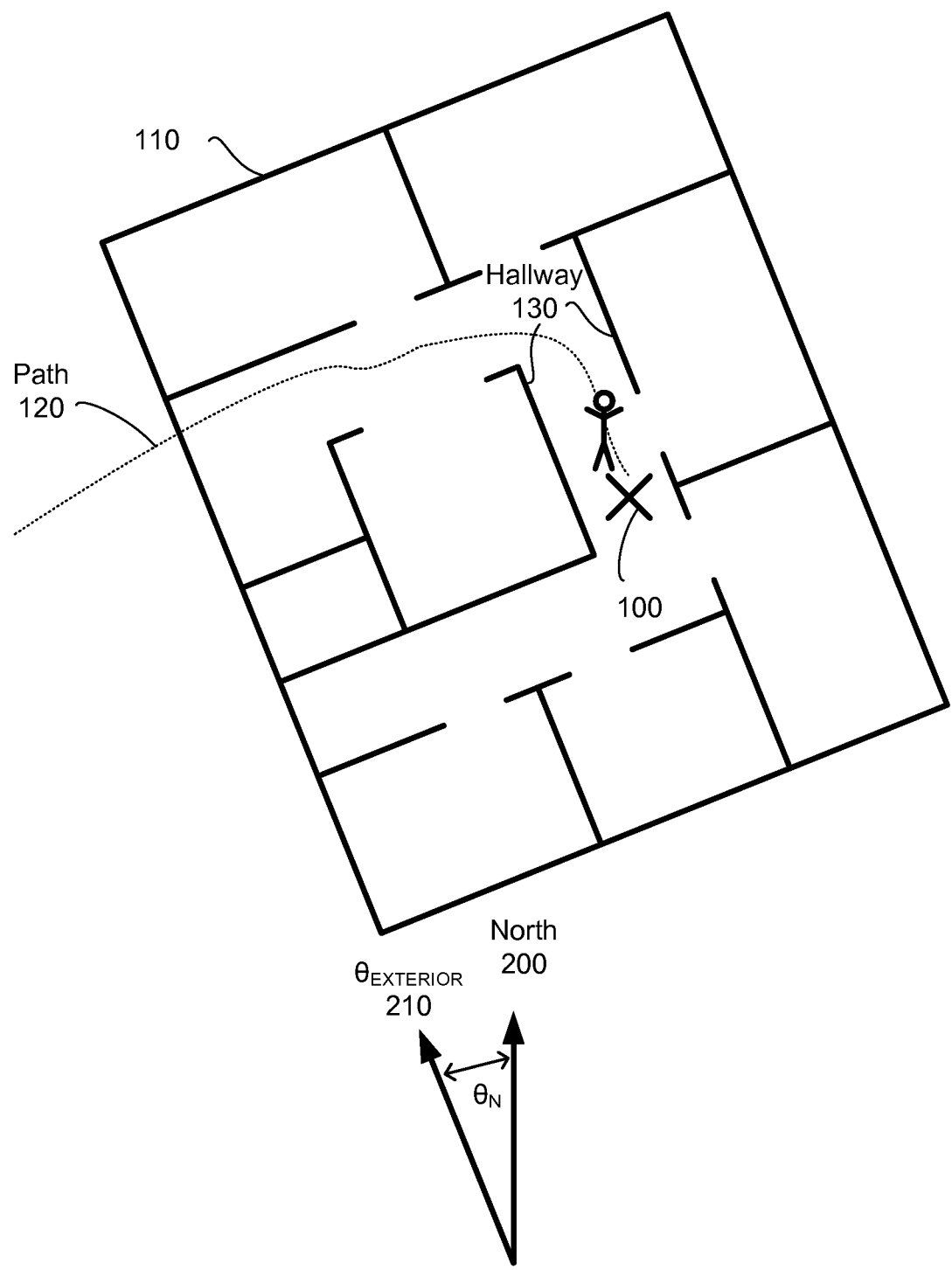

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device 100, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices that communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a mobile device 100.

Embodiments of the present invention use optically-based angle computations derived from images to calibrate less reliable angle measurements provided by sensors 330. Some applications use two interior images (e.g., of the same wall or of adjoining walls). Some applications use one interior image and one exterior image. Some applications use one interior image and one overhead map image. Some applications use one interior image and a table of building orientations. These embodiments may be used to calibrate sensors 330 such as gyrometers 336 and magnetometers 338.

Some applications assume exterior and interior walls are parallel and perpendicular to one another. Other applications are limited to buildings 110 known a priori to have square exterior walls. A lookup table or an overhead map or an overhead satellite image may identify which buildings 110 having square walls and may reference an exterior angle 210 ($\theta_{EXTERIOR}$) for each building 110. Some applications assume interior walls are parallel and perpendicular to exterior walls. In other applications, a mobile device 100 limits application of algorithms described herein to buildings 110 known a priori to have interior walls parallel to exterior walls. Again, such compliant buildings 110 may be determined from a lookup table or an overhead map or an overhead satellite image.

Each angle described and used herein is assumed to have been converted to the horizontal plane such that the angle described may be measured from an overhead view. Also, embodiments assume that a horizontal feature 140 runs along and is parallel to interior walls. In execution, a mobile device 100: (1) determines a relative orientation of a horizontal feature 140 (referred to as a horizontal feature angle 355 ($\theta_{HF\_1}$)) from a captured image; (2) constrains a direction of an interior wall to be parallel or perpendicular to an exterior angle 210 ($\theta_{EXTERIOR}$); (3) compares to sensor measurements to form a sensor misalignment 370 ($\theta_{ERROR}$); and (4) recalibrates a gyrometer 336, recalibrates a magnetometer 338, and/or adjusts other measurements from the sensor 330.

Some embodiments assume that a motion direction 250 ($\theta_{MOTION}$) of a mobile device 100 follows a path 120 that is parallel interior walls. These embodiments may or may not use an image from a camera 320. Such embodiments may be accurate when the motion direction ($\theta_{MOTION}$) is within and along a hallway 130, however, are less accurate when the motion direction ($\theta_{MOTION}$) is within a room and motion is not necessarily aligned to parallel hallways 130. Though less accurate than the embodiments using images of horizontal features 140, such embodiments may be implemented without a camera 320.

Applying this assumed constraint to a horizontal feature 140 determined from a captured image and/or motion can assist in realigning dead reckoning or other navigation, recalibrating a gyrometer 336, recalibrating a magnetometer 338, and/or adjusting other measurements from the sensor 330 is described in further detail below.

Figure 3:
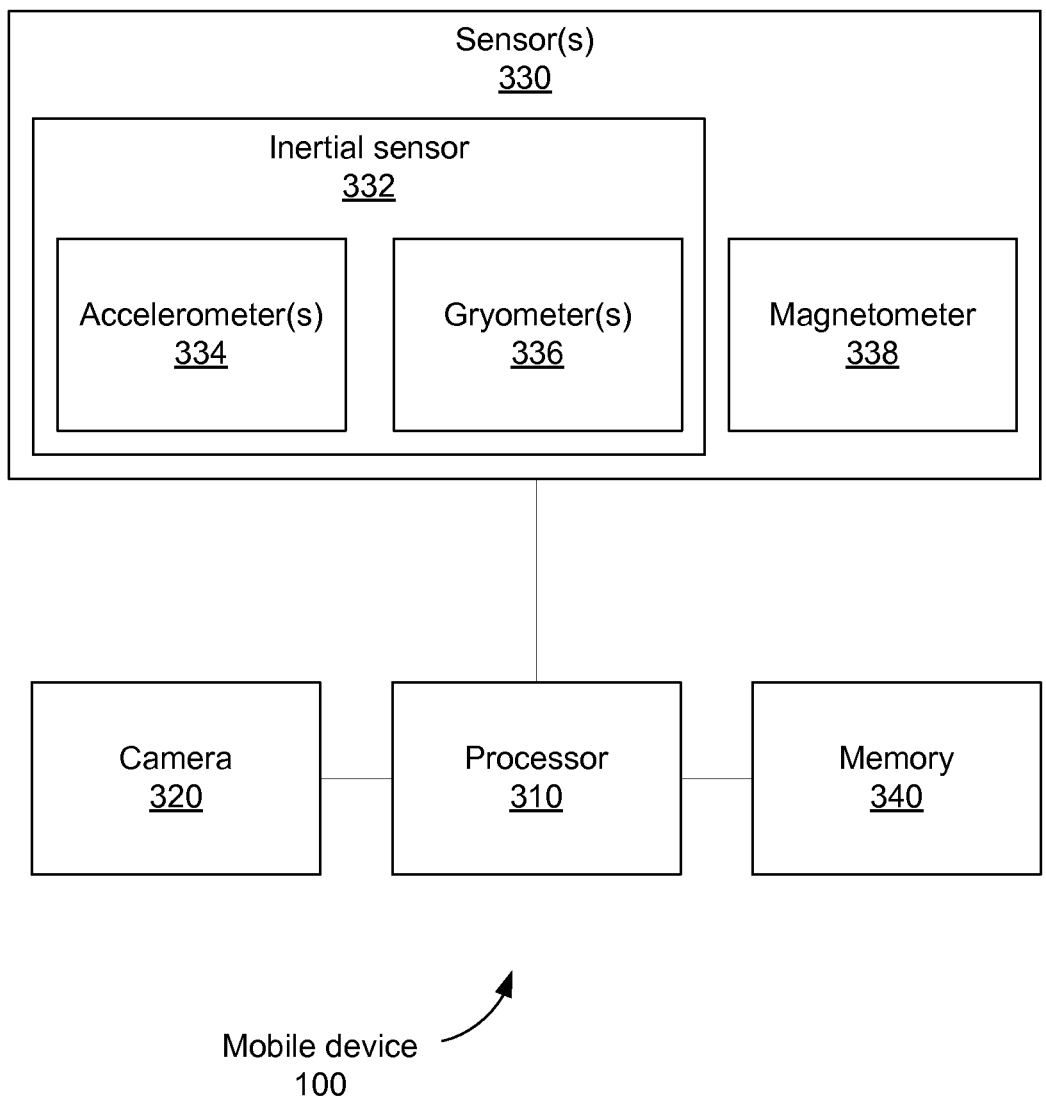
FIG. 3 is a block diagram of a mobile device, in accordance with some embodiments of the present invention.

FIG. 3 is a block diagram of a mobile device 100, in accordance with some embodiments of the present invention. The mobile device 100 includes a processor 310, a camera 320, a sensor 330 and memory 340. The processor 310 may include a single processor, microcontroller, microprocessor, etc. or a set of such devices, as described below. The camera 320 may capture a single image or a sequence of images or a video. The sensor 330 includes an inertial sensor 332 and/or a magnetometer 338. The inertial sensor 332 may include one three-dimensional (3-D) inertial sensor or two or more 3-D inertial sensors, such as one or two accelerometer(s) 334 and/or one or two gyrometer(s) 336. The memory 340 is non-transient (such as RAM and/or ROM) and may include memory separate from and/or integrated with the processor 310. The memory 340 may include volatile and/or non-volatile memory for holding software instructions or code to perform the methods described herein.

Figure 4:
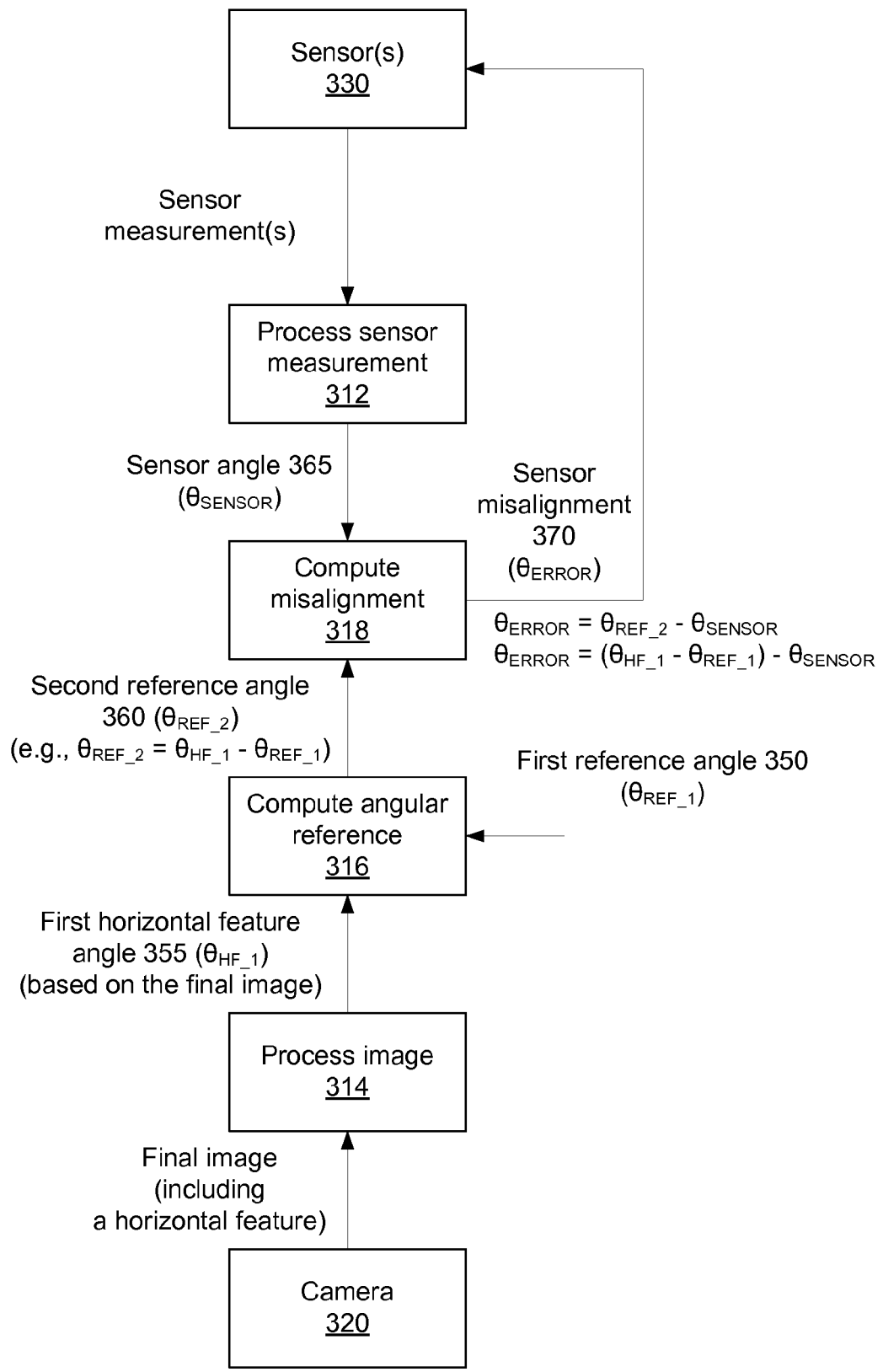
FIG. 4 illustrates a general method for providing calibrated sensor measurements based on a first reference angle ($\theta_{REF\_1}$), a first horizontal feature angle ($\theta_{HF\_1}$) of the horizontal feature and a sensor angle ($\theta_{SENSOR}$), in accordance with some embodiments of the present invention.

FIG. 4 illustrates a general method for providing calibrated sensor measurements based on a first reference angle ($\theta_{REF\_1}$), a first horizontal feature angle 355 ($\theta_{HF\_1}$) of the horizontal feature 140 and a sensor angle 365 ($\theta_{SENSOR}$), in accordance with some embodiments of the present invention. The sensor 330 provides one, two or a sequence of sensor measurements, and a camera 320 provides one or two images including at least one horizontal feature 140. If the camera 320 provides one image, the image is usually captured at a time of the final sensor measurement. If the camera 320 provides two images, one image (referred to as the final image, second image or local image) is usually captured at a time of the final sensor measurement and another image (referred to as the initial image or first image) is usually captured at a time of the initial sensor measurement. The final image is the final or last image needed in a computation and is also referred to as a local image because it is an image taken of an immediate local area).

At 312, the processor 310 receives one or more sensor measurements. The processor 310 processes the sensor measurements to form a sensor angle 365 ($\theta_{SENSOR}$). The sensor angle 365 ($\theta_{SENSOR}$) represents either: (1) a relative angle (e.g., amount of angular change of a mobile device 100 between capture times of two images) sensed by the mobile device 100; or (2) an absolute angle (e.g., a compass heading during a final image, or a final heading from dead reckoning) of the mobile device 100.

Throughout this disclosure, an absolute angle or absolute orientation may be written in the range from 0° to 360°. For example, any absolute angle (θ') may be written as {θ=(θ' modulo)360°}. Thus, 10° is equivalent to 370° is equivalent to −350°. A relative angle or relative orientation, however, should maintain its sign and magnitude of the angle, which may be less than 0° or greater than 360°, thereby accounting for a direction of rotation and a number of full and partial rotations. For example, 0° (representing no rotation) is not equivalent to 360° (representing a full rotation).

At 314, based on a final image, the processor 310 processes the image to determine a horizontal feature angle ($\theta_{HF}$) (e.g., the first horizontal feature angle 355 ($\theta_{HF\_1}$)) between the mobile device 100 and the horizontal feature 140. The first horizontal feature angle 355 ($\theta_{HF\_1}$) is formed from image processing and defines an angle with a high degree of certainty and forms an optical angle with a much higher degree of certainty than an angle provided by sensor measurements from the sensor 330.

At 316, the processor 310 receives a first reference angle 350 ($\theta_{REF\_1}$), which may be predetermined. The first reference angle 350 ($\theta_{REF\_1}$) represents a first orientation of a mobile device 100 measured optically from an initial image or represents an exterior angle 210 ($\theta_{EXTERIOR}$) or an interior angle 220 ($\theta_{INTERIOR}$) of building 110. The processor 310 forms a second reference angle 360 ($\theta_{REF\_2}$) by computing a difference between the first horizontal feature angle 355 ($\theta_{HF\_1}$) and the first reference angle 350 ($\theta_{REF\_1}$) (e.g., $\{\theta_{REF\_2}=\theta_{HF\_1}-\theta_{REF\_1}\}$). The second reference angle 360 ($\theta_{REF\_2}$) represents an angular rotation of the mobile device 100, wherein the angular rotation is based on high certainty optical computations. This second reference angle 360 ($\theta_{REF\_2}$) may be a relative angle or may be an absolute angle.

At 318, the processor 310 computes a sensor misalignment 370 ($\theta_{ERROR}$) based on a difference between the sensor angle 365 ($\theta_{SENSOR}$) and the second reference angle 360 ($\theta_{REF\_2}$). This difference may be shown as $\{\theta_{ERROR}=\theta_{REF\_2}-\theta_{SENSOR}\}$. Of course, steps 316 and 318 may be performed in one step as $\{\theta_{ERROR}=\theta_{HF}-\theta_{REF\_1}-\theta_{SENSOR}\}$. The sensor misalignment 370 ($\theta_{ERROR}$) is fed back to the sensor 330 or alternatively to step 314, to correct future sensor measurements. Alternatively, a fraction of the sensor misalignment 370 ($\theta_{ERROR}$) is fed back so that the correction is more gradual and less likely to overshoot. Alternatively, only the sign of the sensor misalignment 370 ($\theta_{ERROR}$) is fed back such that the system takes steps of a predetermined size as the feedback signal.

Specific implementations are shown with relation to the following figures. Variations to FIG. 4 and additional detail in the following figures are described with reference to FIGS. 5-15 described below, however, the description of repeated figure elements are not repeated for the sake of clarity.

FIGS. 5-8 illustrate a first implementation of the method of FIG. 4 based on two images, in accordance with some embodiments of the present invention. The example shows a sensor 330 that includes at least a gyrometer 336 and the first reference angle 350 ($\theta_{REF\_1}$) is based on an initial image.

Figure 5:
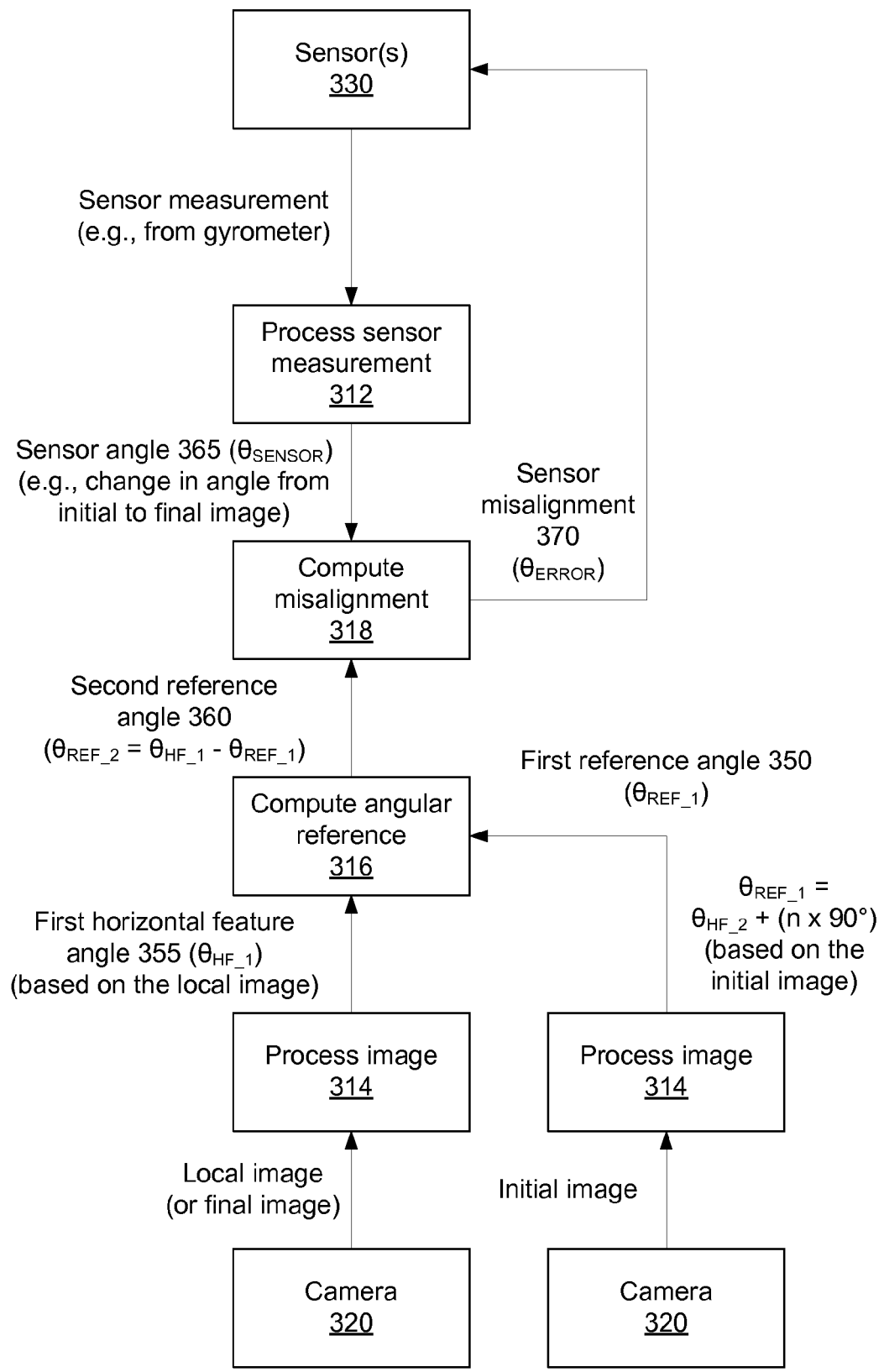
FIGS. 5-8 illustrate a first implementation of the method of FIG. 4 based on two images, in accordance with some embodiments of the present invention.

In FIG. 5, the camera 320 provides two images: an initial image and a final image. Both images are processed similarly at step 314 to extract angles of one or two horizontal features 140: a first horizontal feature angle 355 ($\theta_{HF\_1}$) based on the final image and a second horizontal feature angle ($\theta_{HF\_2}$) based on the initial image. The second horizontal feature angle ($\theta_{HF\_2}$) is used to form the first reference angle 350 ($\theta_{REF\_1}$) based on the initial image. The processor 310 sets the first reference angle 350 ($\theta_{REF\_1}$) is based on the second horizontal feature angle ($\theta_{HF\_2}$) such that $\{\theta_{REF\_1}=\theta_{HF\_2}+(n\times 90°)\}$, where n is based on the initial image as explained below with reference to FIGS. 7 and 8. Each angle that is an integer multiple of 90° from a reference angle may also be written as a modulo of: (1) the reference angle plus n×90°: with (2) 360°, wherein n is any positive, negative or zero valued integer. The modulo formula may result in an angle spanning 360°, for example, between 0 and 360° or between −180° and +180°.

Figure 6:
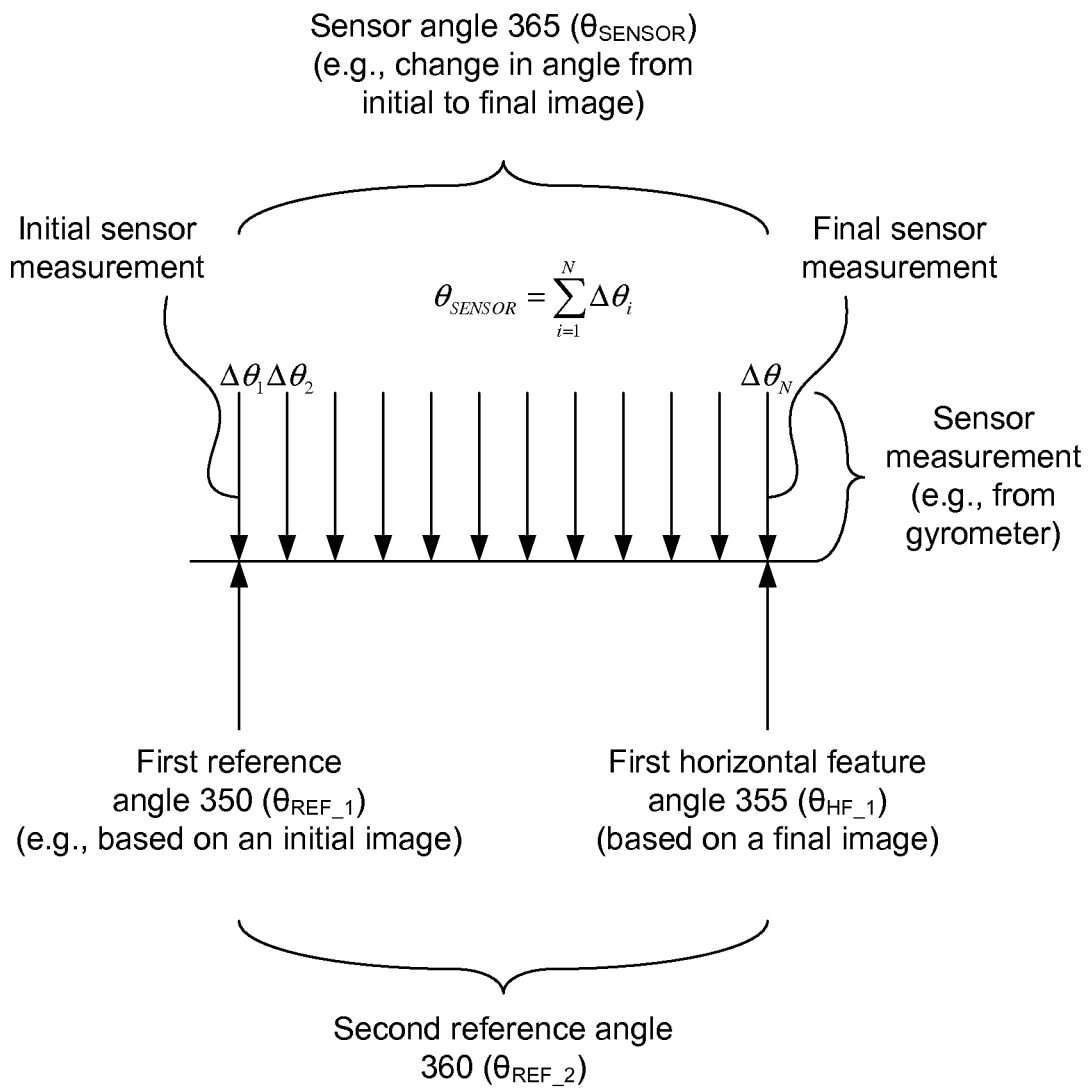

As shown in FIG. 6, the sensor 330 provides several sensor measurements from a gyrometer 336. An initial sensor measurement represents a time when the initial image was captured. A final sensor measurement represents a time when the final image was captured. Each sensor measurement represents a small change in rotation angle since the previous sensor measurement, such that the computed sensor angle 365 is $$\theta_{SENSOR} = \sum_{i=1}^{N} \Delta\theta_i,$$

where N is the number of sensor measurements. Each sensor measurement ($\Delta\theta_i$) represents an incremental increase or decrease in rotation of the mobile device 100. For example, if a mobile device 100 is rotated at a constant rate of 50° per second and sensor measurements occur at a rate of 100 samples per second, then each sample on average would show an angular change of 0.5° per sample.

By integrating the several sensor measurements from a time an initial image was captured to a time the final image was captured, the processor 310 may compute a sensor angle 365 ($\theta_{SENSOR}$). This sensor angle 365 ($\theta_{SENSOR}$) may have accumulated error over the duration between the two images. Also shown are a first reference angle 350 ($\theta_{REF\_1}$) derived from the initial image and captured during a period of an initial sensor measurement ($\Delta\theta_1$), and a first horizontal feature angle 355 ($\theta_{HF\_1}$) derived from the final image and captured during a period of a final sensor measurement ($\Delta\theta_N$). The difference between the first horizontal feature angle 355 ($\theta_{HF\_1}$) and the first reference angle 350 ($\theta_{REF\_1}$) results in the second reference angle 360 ($\theta_{REF\_2}$), which is an optically formed angle with high certainty.

When a camera 320 captures two images of a common interior wall, the images may contain a common horizontal feature 140 from two different angles. When a camera 320 captures two images of two different interior walls, the two images may be of perpendicular or parallel walls and each image contains a different horizontal feature 140. In each case, a mobile device 100 rotates a relative angle between images. Based on the image processing of 314 and the computations of 316 and 318, this rotation angle is computed as a second reference angle 360 ($\theta_{REF\_2}$), which is based on the first horizontal feature angle 355 ($\theta_{HF\_1}$) and the first reference angle 350 ($\theta_{REF\_1}$). The second reference angle 360 ($\theta_{REF\_2}$) is an optically obtained angle and represents a rotation of the mobile device during a time between the two images with a high degree of certainty.

Figure 7:
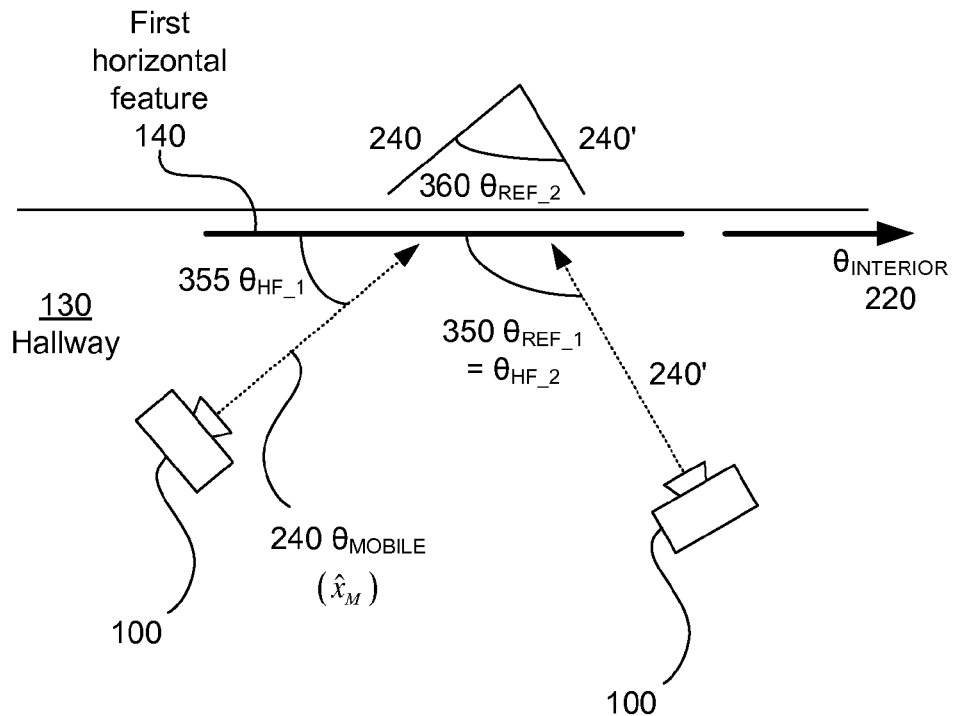

In FIG. 7, a common horizontal feature 140 is view from a first perspective 240' and a second perspective 240. The initial viewing angle is the second horizontal feature angle ($\theta_{HF\_2}$) determined from an initial image was captured at an initial time with a mobile orientation 240' ($\theta_{MOBILE}$) of the mobile device 100. The final viewing angle is the first horizontal feature angle 355 ($\theta_{HF\_1}$) determined from a final image was captured at a final time with a mobile orientation 240 ($\theta_{MOBILE}$) of the mobile device 100. Since both images reference the same horizontal feature 140 along a common interior wall, the first reference angle 350 ($\theta_{REF\_1}$) is simply set to the value of the second horizontal feature angle ($\theta_{HF\_2}$). The difference between the first horizontal feature angle 355

($\theta_{HF\_1}$) and the first reference angle 350 ($\theta_{REF\_1}$) is set as the second reference angle 360 ($\theta_{REF\_2}$).

Figure 8:
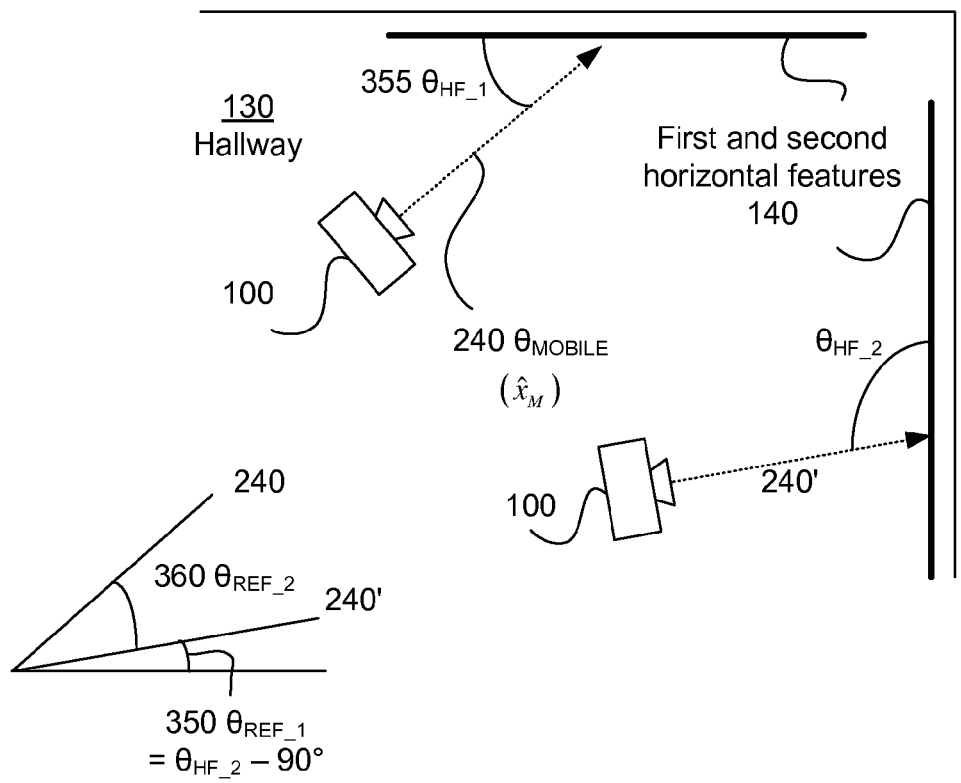

In FIG. 8, two different horizontal features 140 along different interior walls are viewed from two viewing angles: from a first perspective 240' and a second perspective 240. The first horizontal feature 140 is viewed from a first horizontal feature angle 355 ($\theta_{HF\_1}$) and the second horizontal feature 140 is viewed from a second horizontal feature angle ($\theta_{HF\_2}$). From rough sensor measurements, the mobile device 100 is able to determine the two angles ($\theta_{HF\_1}$ & $\theta_{HF\_2}$) are of horizontal features 140 along different interior walls, which are most likely perpendicular interior walls. The first reference angle 350 ($\theta_{REF\_1}$) is set to a value to compensate for the two horizontal features 140 having different orientations. In this case, based on the assumption that the two images are of perpendicular horizontal features 140, the first reference angle 350 ($\theta_{REF\_1}$) is set to remove 90° (i.e., $\theta_{REF\_1} = \theta_{HF\_2} - 90°$.

In general, the processor 310 computes {$\theta_{REF\_1} = \theta_{HF\_2} + (n \times 90°)$}, where n=0, ±1, ±2 or ±3 (assuming the mobile device 100 does not make a complete rotation). When the horizontal feature 140 in the two images is along a common wall, then n=0. When the horizontal features 140 in the two images are along perpendicular walls, then n=±1. When the horizontal features 140 in the two images are along opposite walls, then n=±2. A processor 310 may use a convention where a positive compensation (+90°, +180° or)+270° is used when the mobile device 100 undergoes a counter-clockwise rotation and negative compensation (−90°, −180° or) −270° is used when the mobile device 100 undergoes a clockwise rotation. By adjusting the second horizontal feature angle ($\theta_{HF\_2}$) with 0°, ±90°, ±180° or ±270° to form the first reference angle 350 ($\theta_{REF\_1}$), the two angles ($\theta_{HF\_1}$ & $\theta_{REF\_1}$) are in a common reference frame and may be directly subtracted to form a relative angle (namely, the second reference angle 360 ($\theta_{REF\_2}$)).

Figure 9:
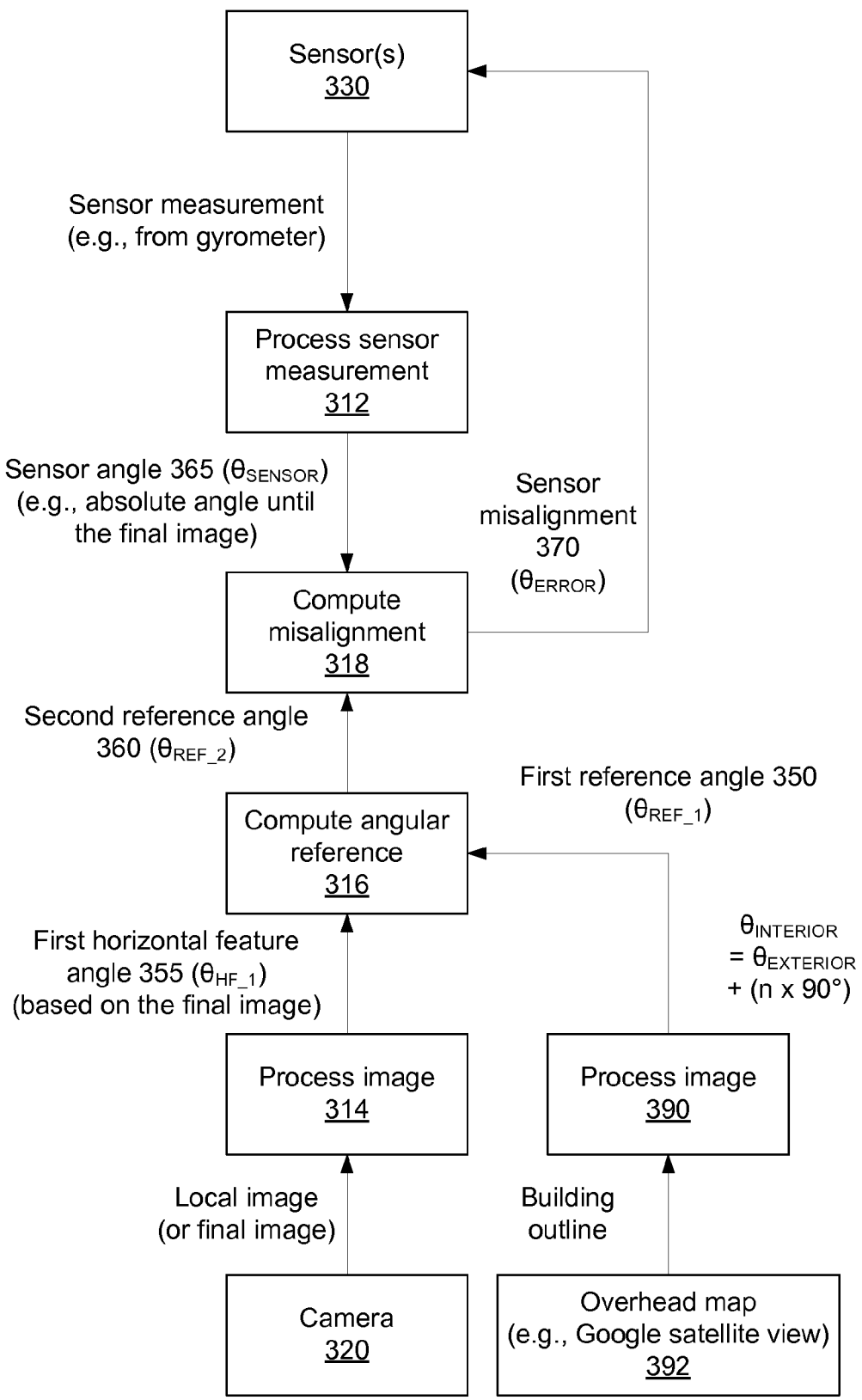
FIGS. 9-11 illustrate a second implementation of the method of FIG. 4 based on a map, in accordance with some embodiments of the present invention.
Figure 10:
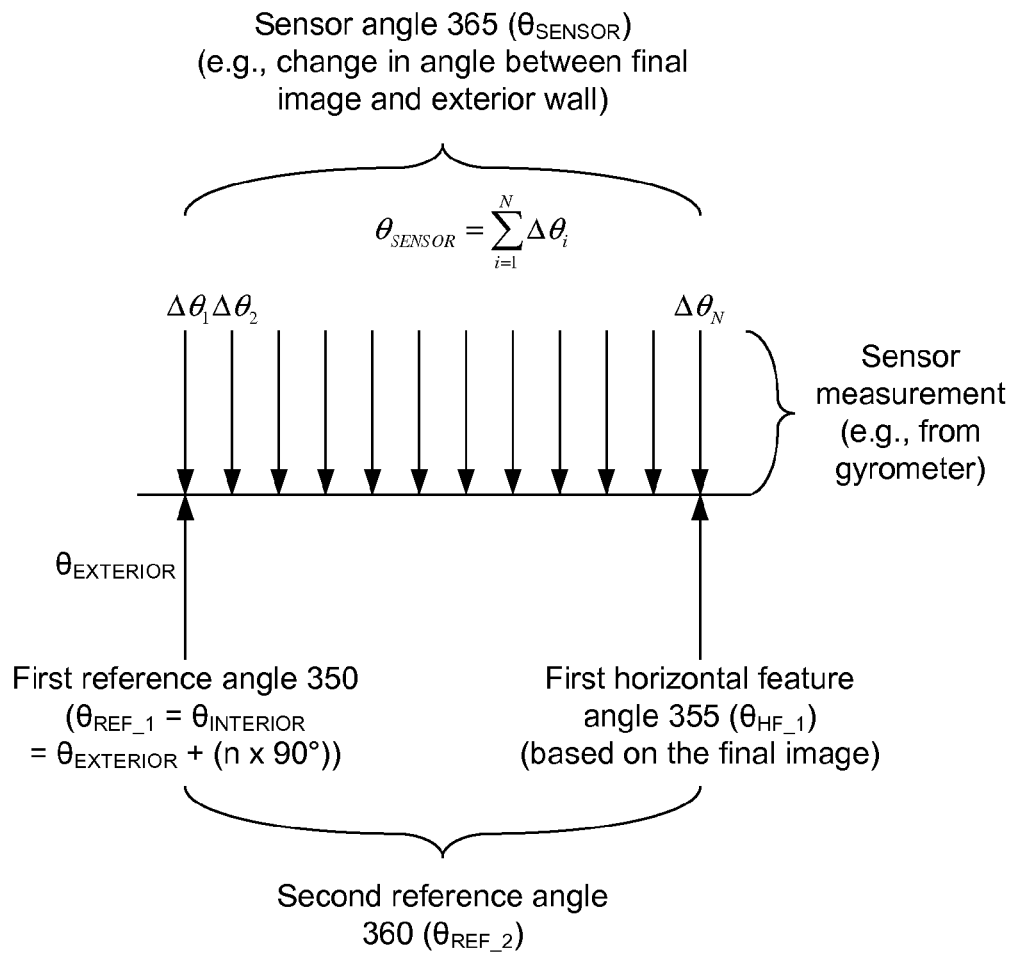
Figure 11:
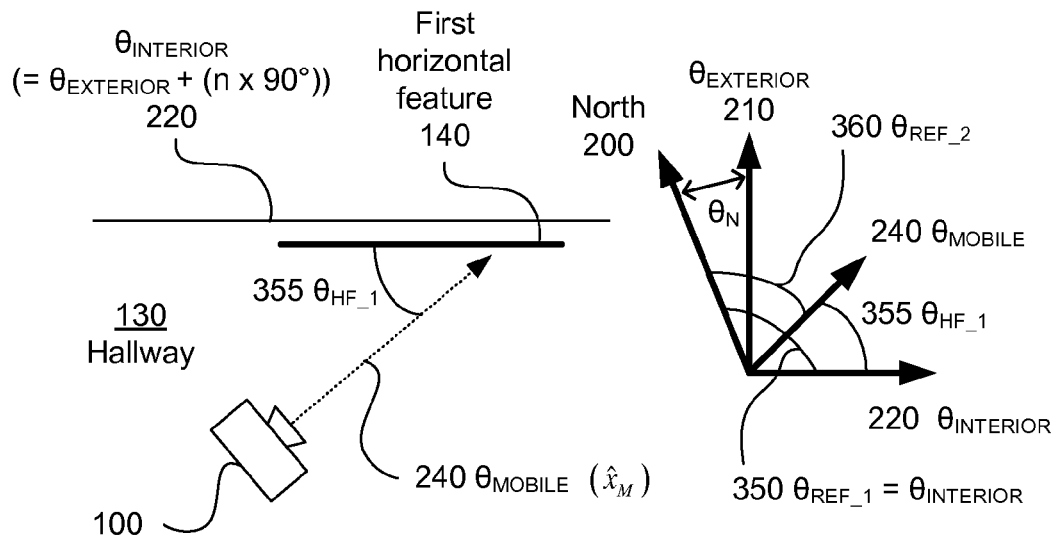

FIGS. 9-11 illustrate a second implementation of the method of FIG. 4 based on a map, in accordance with some embodiments of the present invention. Instead of being provided by an initial image or first image captured from the mobile device 100 as described in the embodiment above, FIG. 9 shows a reference angle ($\theta_{REF}$) (e.g., a first reference angle 350 ($\theta_{REF\_1}$)), derived from an overhead map 392. Therefore, the first reference angle 350 ($\theta_{REF\_1}$) is an absolute direction and independent of an orientation of the mobile device 100.

In FIG. 9, an overhead map 392, such as a Google satellite view, provides a source for detecting an outline of a building 110. At 390, the processor 310 retrieves a copy of the overhead map 392 including an overhead view of a building 110. The processor 310 may select the overhead map 392 based on the last known position estimate of the mobile device 100 and which building 110 is closest to or most likely a building 110 in which the mobile device 100 now resides. The processor 310 then performs image processing of the overhead map 392 to extract an exterior angle 210 ($\theta_{EXTERIOR}$) of an exterior wall. The mobile device 100 may select any wall of the exterior outline as the exterior angle 210 ($\theta_{EXTERIOR}$), for example, an exterior wall angle from 0° and 90° as compared to North 200. The mobile device 100 then assumes that each exterior and interior wall is oriented at the exterior angle 210 ($\theta_{EXTERIOR}$) or at an offset of 90°, 180° or 270° from the exterior angle 210 ($\theta_{EXTERIOR}$) to set an interior angle 220 ($\theta_{INTERIOR}$). Next, the processor 310 determines which interior wall contains the first horizontal feature, then sets the interior angle 220 ($\theta_{INTERIOR}$) to the absolute angle {$\theta_{INTERIOR} = \theta_{EXTERIOR} + (n \times 90°)$}, where n=0, 1, 2 or 3. The first reference angle 350 ($\theta_{REF\_1}$) is equals the interior angle 220 ($\theta_{INTERIOR}$).

At 312, the processor 310 produces an absolute angle as the sensor angle 365 ($\theta_{SENSOR}$) oriented with respect to North 200. For example, the sensor angle 365 ($\theta_{SENSOR}$) is set to a dead reckoning heading at a capture time of the final image. At 316, the processor 310 computes a second reference angle 360 ($\theta_{REF\_2}$), which is an absolute angle, from the first horizontal feature angle 355 ($\theta_{HF\_1}$) and the first reference angle 350 ($\theta_{REF\_1}$), which are also absolute angles. At 318, the processor 310 computes the sensor misalignment 370 ($\theta_{ERROR}$), a relative angle, based on the two absolute angles: the second reference angle ($\theta_{REF\_2}$) and the sensor angle 365 ($\theta_{SENSOR}$).

Some embodiments use the method described above to navigation using a mobile device using a reference wall. The mobile device determines a reference angle ($\theta_{REF}$) of the reference wall. The reference wall may provide a reference angle ($\theta_{REF}$) that is an absolute angle with respect to North. The reference wall may be an exterior wall or an interior wall. The reference angle ($\theta_{REF}$) may be captured from an initial image and extracted from that image, may be determined based on the building that the mobile device is in, closest to or about to enter, may be found from an overhead map, and/or looked up from a table or other database.

The mobile device uses a camera or other optical sensor to capture an image of the local surroundings. If the local image contains a horizontal feature, the mobile device process the local image to determine a horizontal feature angle ($\theta_{HF}$) of the horizontal feature. The horizontal feature may be a top edge of a door frame, a bottom edge of a closed door, an edge of a window frame and window, a name plate, a picture or poster hanging from a wall, the edge between the wall and the ceiling or floor, or an edge of a piece of furniture. The horizontal feature angle ($\theta_{HF}$) measures a horizontal angle spanning from a current orientation of the mobile device to the horizontal feature. That is, it is a relative angle between to objects.

The mobile device next selects a wall angle of the horizontal feature. The wall angle is assumed to be either square or parallel to the reference wall. As such, the wall angle is equal to an integer multiple of 90° from the reference angle ($\theta_{REF}$) following a modulo operation if the resulting wall angle is greater than a 360° span (e.g., 0° to 360° or −180° to +180°. For example, the wall angle may be set to one of four angles equal to modulo of (the reference wall+n*90°) with 360°, where n is a positive, negative or zero value integer. Using inertial sensors or a compass, the mobile device may make guess of which one of the four possible wall angles is the correct wall angle. Even if an inertial sensor direction has accumulated up to just under 45° of error, the mobile device selects the wall that is closest in direction. The difference between the selected wall angle and the sensor direction with accumulated error may be used to weight, reset and/or calibrate readings from the sensor. That is, a sensor misalignment ($\theta_{ERROR}$) may be derived from a difference between: (1) current orientation ($\theta_{SENSOR}$) of the mobile device based on the inertial sensor measurements from the inertial sensor; and (2) an angle of the current orientation of the mobile device. The sensor misalignment ($\theta_{ERROR}$) may then be used to calibrate the inertial sensor.

The mobile device may then determine an absolute angle in the horizontal plane of the current orientation of the mobile device based on a combination of the horizontal feature angle ($\theta_{HF}$) and the wall angle. This absolute angle may be used determine an updated position or direction of motion of the mobile device. For example, such an absolute angle may be used to assist a dead-reckoning algorithm.

In its rudimentary form, a mobile device may be assumed to be following an interior wall. That is, with or without a camera image, direction of motion of the mobile device may be limited to motion in line or perpendicular to the reference wall, thereby performing wall matching. In other embodiments with a camera, a mobile device navigates using wall matching with any horizontal feature to estimate motion. The mobile device captures a local image with a camera in the mobile device. The local image is an image of the immediate local area of the mobile device. If the local image contains a horizontal feature, the mobile device processes the local image to determine a horizontal feature angle ($\theta_{HF}$). Again, the horizontal feature angle ($\theta_{HF}$) is an angle in the horizontal plane spanning from a current orientation of the mobile device to the horizontal feature. The mobile device also estimated a direction of motion of the mobile device as one of four directions based on the horizontal feature angle ($\theta_{HF}$) and assuming motion of the mobile device is parallel to the wall angle containing the horizontal feature.

The mobile device may also determine a reference angle ($\theta_{REF}$) of a reference wall, wherein the reference angle ($\theta_{REF}$) is an absolute angle with respect to North, then select a wall angle, of the horizontal feature, equal to an integer multiple of 90° from the reference angle ($\theta_{REF}$), as described above. The mobile device may compute the reference angle ($\theta_{REF}$) as described above, such as by capturing an initial image and then computing the reference angle ($\theta_{REF}$) based on the initial image.

In some embodiments, a reference wall is used to calibrate an inertial sensor. The mobile device captures a first image, at a first time from the mobile device in a first orientation, wherein the first image contains a horizontal feature. The mobile device then determines a first horizontal feature angle ($\theta_{HF\_1}$) of the horizontal feature in the first image, wherein the first horizontal feature angle ($\theta_{HF\_1}$) is an angle from the mobile device in the first orientation at the first time to the horizontal feature in the first image.

The mobile device also captures a second image, at a second time from the mobile device in a second orientation, wherein the second image contains a horizontal feature. The mobile device then determines a second horizontal feature angle ($\theta_{HF\_2}$) of the horizontal feature in the second image, wherein the second horizontal feature angle ($\theta_{HF\_2}$) is an angle from the mobile device in the second orientation at the second time to the horizontal feature in the second image.

The mobile device then computes a difference between the first horizontal feature angle ($\theta_{HF\_1}$) and the second horizontal feature angle ($\theta_{HF\_2}$) to form an optical sensor rotation. In parallel, the mobile device measures, with the inertial sensor, a rotation of the mobile device from the first orientation at the first time to the second orientation at the second time to form an inertial sensor rotation. Based on a difference between the optical sensor rotation and the inertial sensor rotation, the mobile device may derive a sensor misalignment ($\theta_{ERROR}$) that may be fed back to the sensor.

In FIG. 10, a sensor angle 365 ($\theta_{SENSOR}$) is computed from a time when an absolute orientation of the mobile device 100 is known. This time coincides with the time of a first reference angle 350 ($\theta_{REF\_1}$). For example, the processor 310 integrates from a time when the mobile device 100 is outside to the capture time of a final image. The final image, containing a first horizontal feature 140 on an interior wall, is used to set the first horizontal feature angle 355 ($\theta_{HF\_1}$). The processor 310 determines which interior wall is most likely the interior wall in the final image based on a rough heading provided by the sensors 300. The first reference angle 350 ($\theta_{REF\_1}$) may be set to the angle of the exterior wall or an angle of the interior wall containing the horizontal feature 140.

In FIG. 11, a final image (or local image) is captured along a mobile orientation 240 ($\theta_{MOBILE}$) towards a (first) horizontal feature 140 along an interior wall. Again, the angle between the mobile orientation 240 ($\theta_{MOBILE}$) and the interior angle 220 ($\theta_{INTERIOR}$) is computed via image processing at 314 as the first horizontal feature angle 355 ($\theta_{HF\_1}$) (or horizontal feature angle ($\theta_{HF}$)). The interior angle 220 ($\theta_{INTERIOR}$) is selected as the closest interior wall based on the exterior angle 210 ($\theta_{EXTERIOR}$) and the rough sensor heading.

Figure 12:
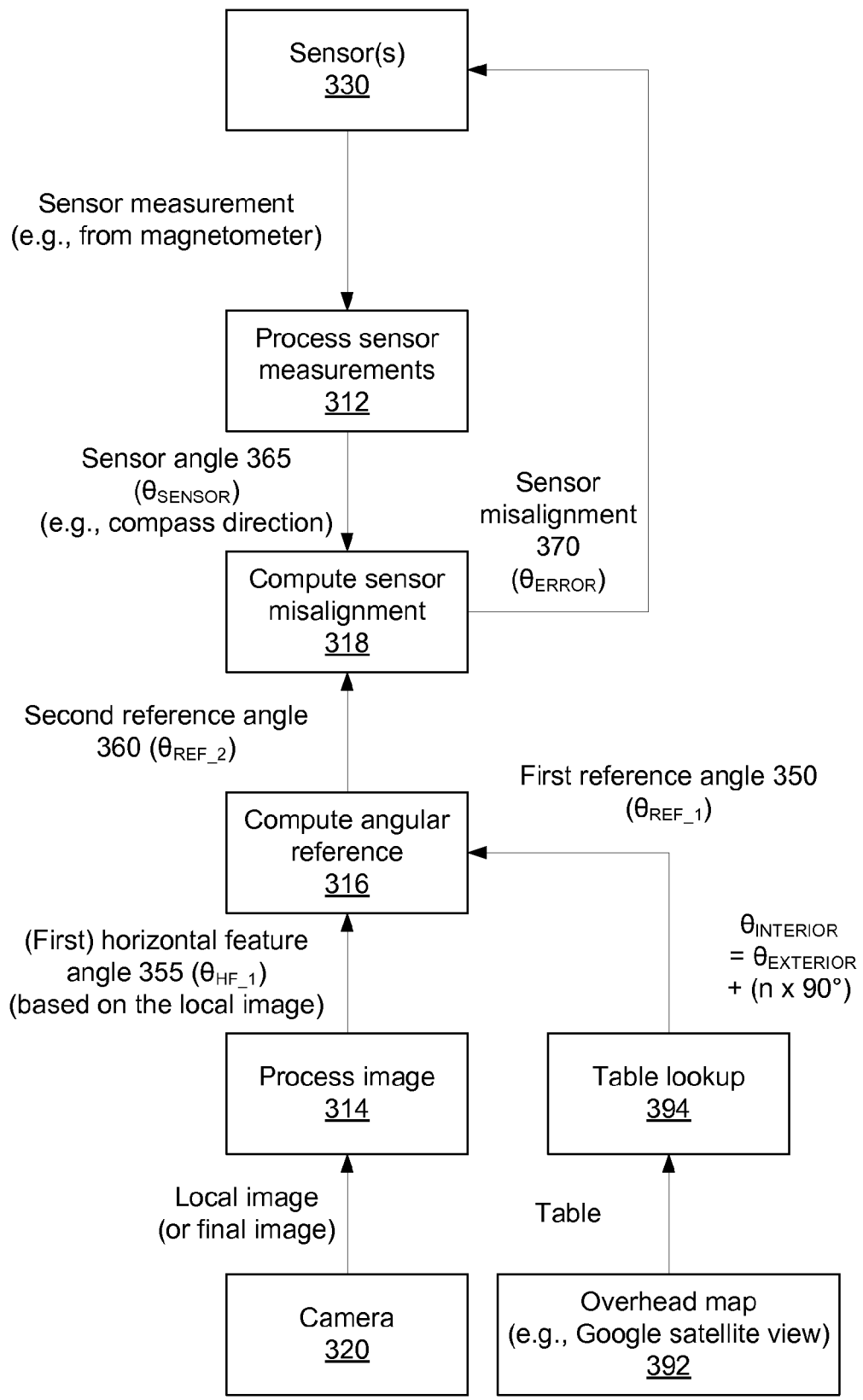
FIGS. 12 and 13 illustrate a third implementation of the method of FIG. 4 using a magnetometer and a table, in accordance with some embodiments of the present invention.
Figure 13:
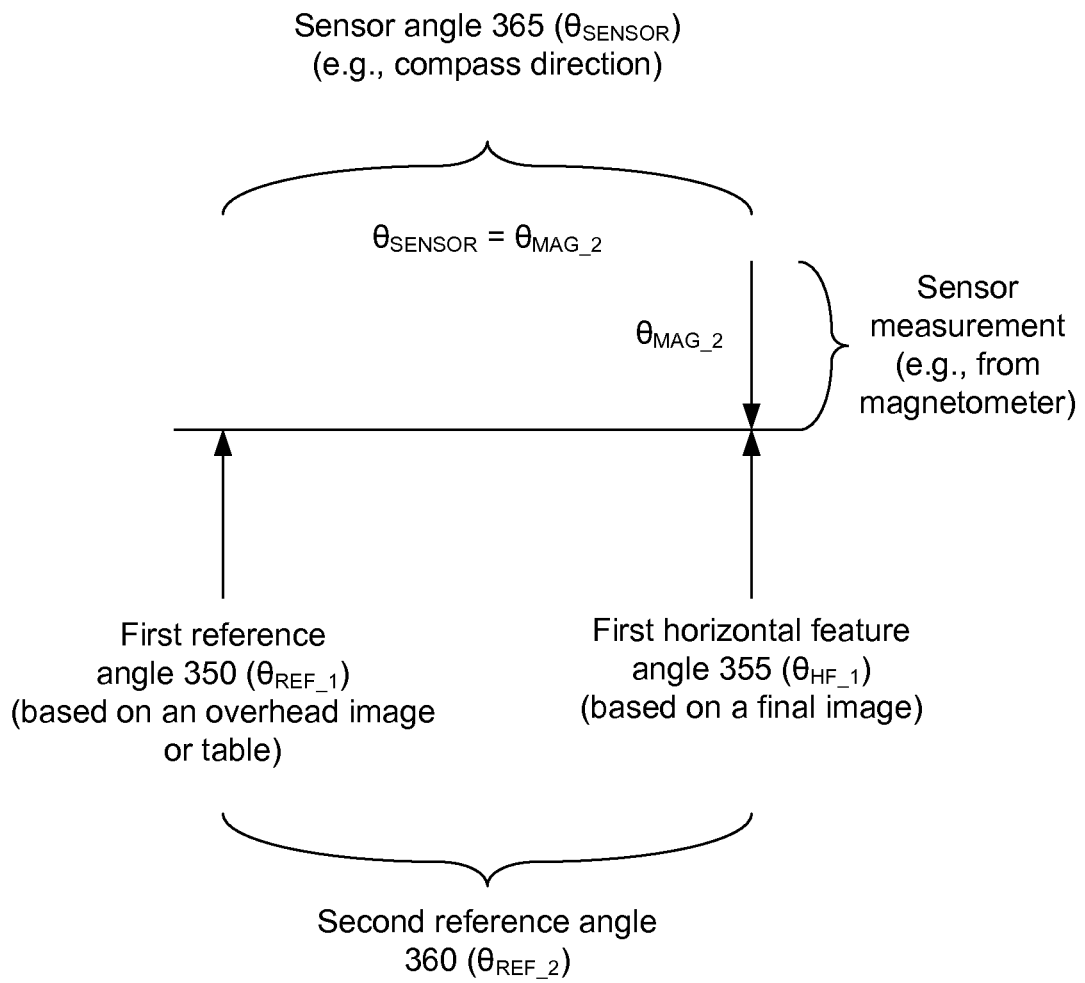

FIGS. 12 and 13 illustrate a third implementation of the method of FIG. 4 using a magnetometer 338 and a table, in accordance with some embodiments of the present invention. In FIG. 12, a third embodiment is shown. In this case, the first reference angle 350 ($\theta_{REF\_1}$) is based on a table entry containing an exterior angle 210 ($\theta_{EXTERIOR}$), and the sensor 330, which includes a magnetometer 338, provides sensor measurements that indicate an absolute compass direction.

At 312, the processor 310 processes the sensor measurements to form an absolute angle (sensor angle 365 ($\theta_{SENSOR}$)). The sensor angle 365 ($\theta_{SENSOR}$) may be a pass-through sensor measurement or may be a low pass filtered version of multiple sensor measurements and represents a heading as an absolute angle.

At 394, a table of exterior angles 210 ($\theta_{EXTERIOR}$) if formed and is indexed by building locations. For this embodiment, a remote server may process an overhead map 392 to extract exterior angles 210 ($\theta_{EXTERIOR}$) of various buildings 110 and may either provide this table to the mobile device 100 or may respond to a position estimate with an exterior angle 210 ($\theta_{EXTERIOR}$) of the closest building 110.

In FIG. 13, a single sensor measurement providing an absolute compass heading ($\theta_{MAG\_2}$) may be used to set the sensor angle 365 ($\theta_{SENSOR}$). The local image or final image is used to set an optically based angle (e.g., the horizontal feature angle ($\theta_{HF}$) or the first horizontal feature angle 355 ($\theta_{HF\_1}$), which is much more reliable than the sensor angle 365 ($\theta_{SENSOR}$). A sensor misalignment 370 ($\theta_{ERROR}$) may be set using the first reference angle 350 ($\theta_{REF\_1}$), the first horizontal feature angle 355 ($\theta_{HF\_1}$) and the sensor angle 365 ($\theta_{SENSOR}$), and may be used to adjust the magnetometer 338.

Figure 14:
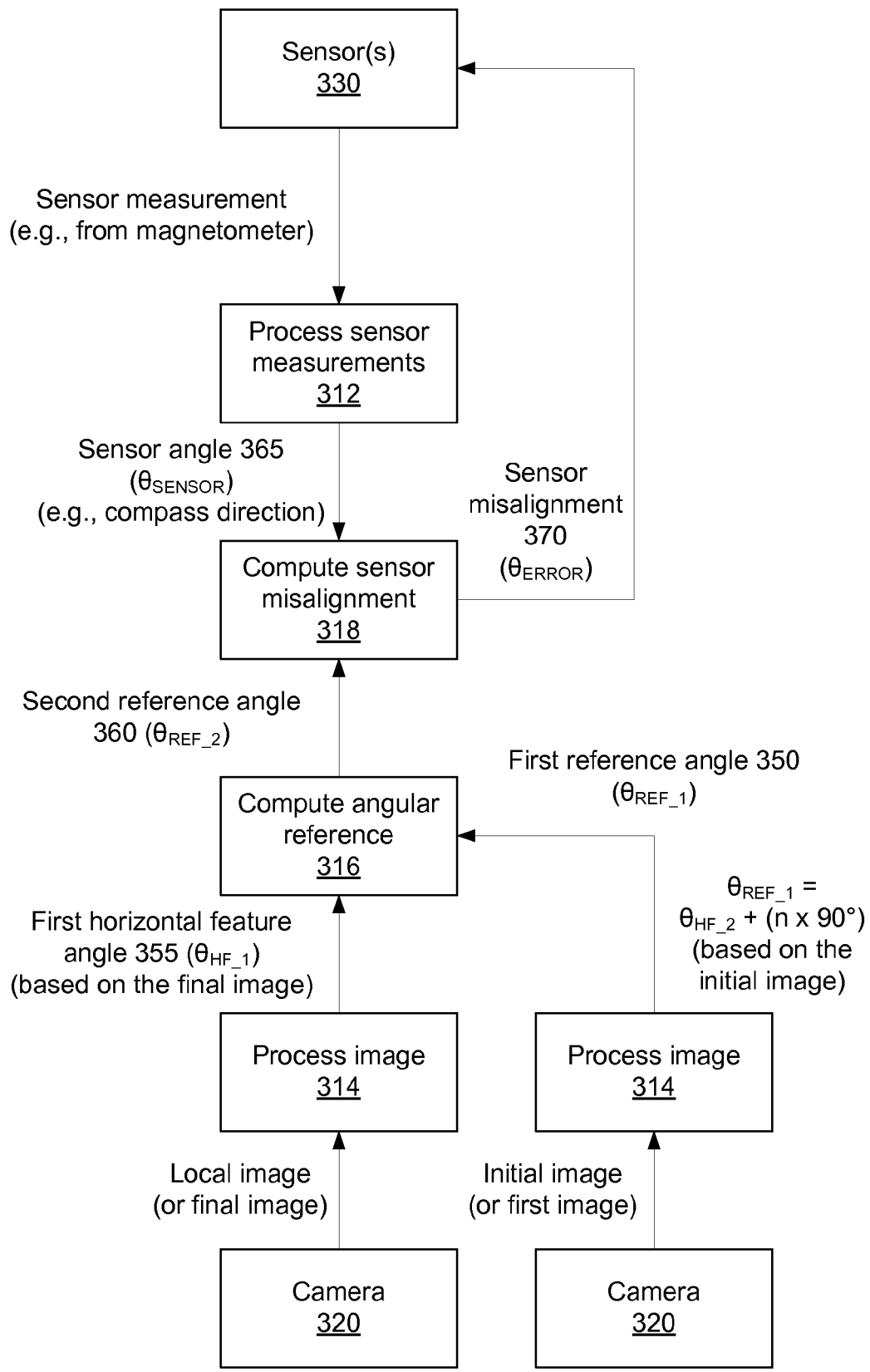
FIGS. 14 and 15 illustrate a fourth implementation of the method of FIG. 4 using a magnetometer and two images, in accordance with some embodiments of the present invention.
Figure 15:
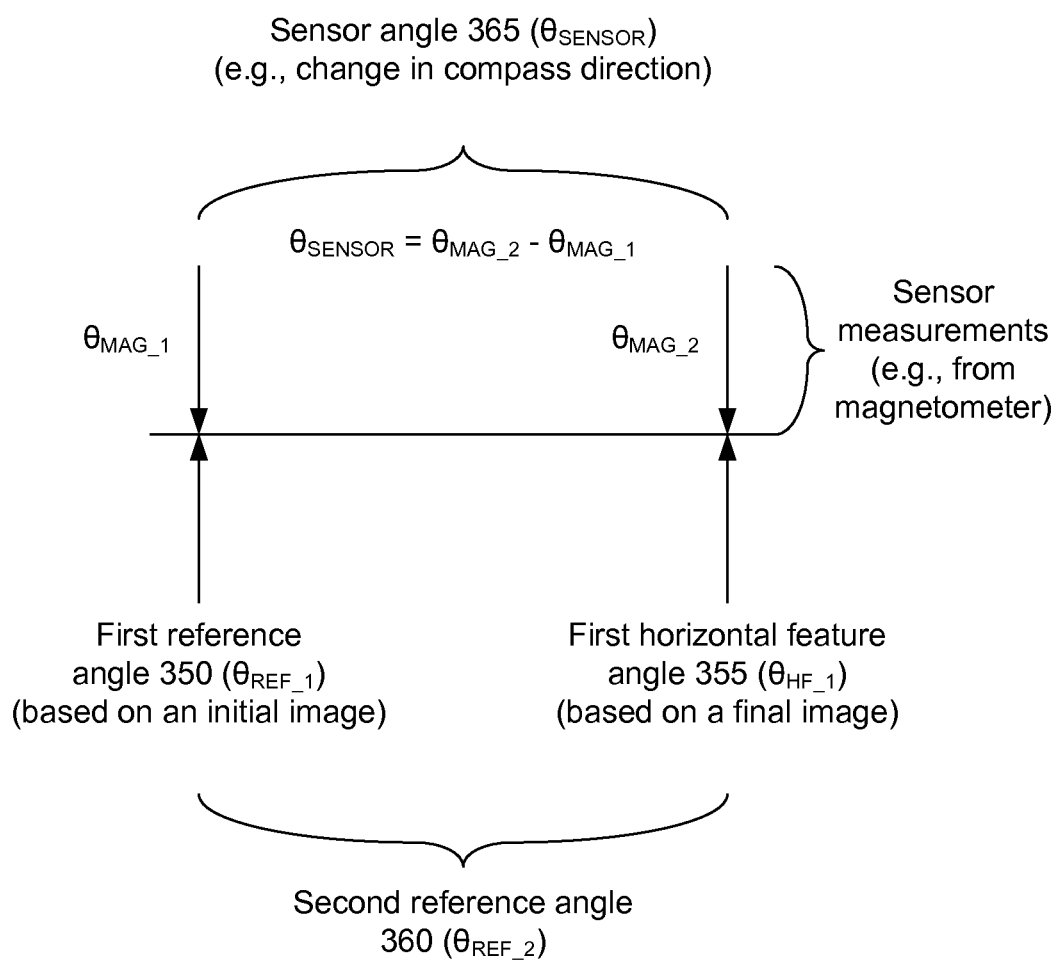

FIGS. 14 and 15 illustrate a fourth implementation of the method of FIG. 4 using a magnetometer 338 and two images, in accordance with some embodiments of the present invention. In FIG. 14, the first reference angle 350 ($\theta_{REF\_1}$) is based on an initial image from the camera 320, and the sensor 330, which includes a magnetometer 338, provides sensor measurements that indicate an absolute compass direction. The embodiment is further illustrated in FIG. 15, which shows the sensor angle 365 ($\theta_{SENSOR}$) as a relative angle and is the difference between a compass heading ($\theta_{MAG\_1}$) (taken during a time of the initial image was captured) and a compass heading ($\theta_{MAG\_2}$) (taken during a time of the final image was captured). The difference between the first horizontal feature angle 355 ($\theta_{HF\_1}$) and the first reference angle 350 ($\theta_{REF\_1}$) sets the second reference angle 360 ($\theta_{REF\_2}$). The difference between the two relative angles (the sensor angle 365 ($\theta_{SENSOR}$) and the second reference angle 360 ($\theta_{REF\_2}$)) forms the sensor misalignment 370 ($\theta_{ERROR}$).

The figures described above combined various types of sensor measurements with various sources for a first reference angle 350 ($\theta_{REF\_1}$). Some configurations used sensor measurements from a gyrometer 336 while other configurations used sensor measurements from a magnetometer 338. Some configurations used two images while other embodiments used one image and a table or overhead map. Some of these configurations produced an absolute sensor-derived angle and an absolute optical-derived angle, while other configurations produced a relative sensor-derived angle and a relative optical-derived angle. These sensor and optical angles were compared to produce a sensor misalignment 370 ($\theta_{ERROR}$) and a feedback signal. While various configurations have been illustrated, these configurations are not exclusive to one another and may be combined or overlapped in execution. The following figure further illustrates aspects of these configurations.

Figure 16:
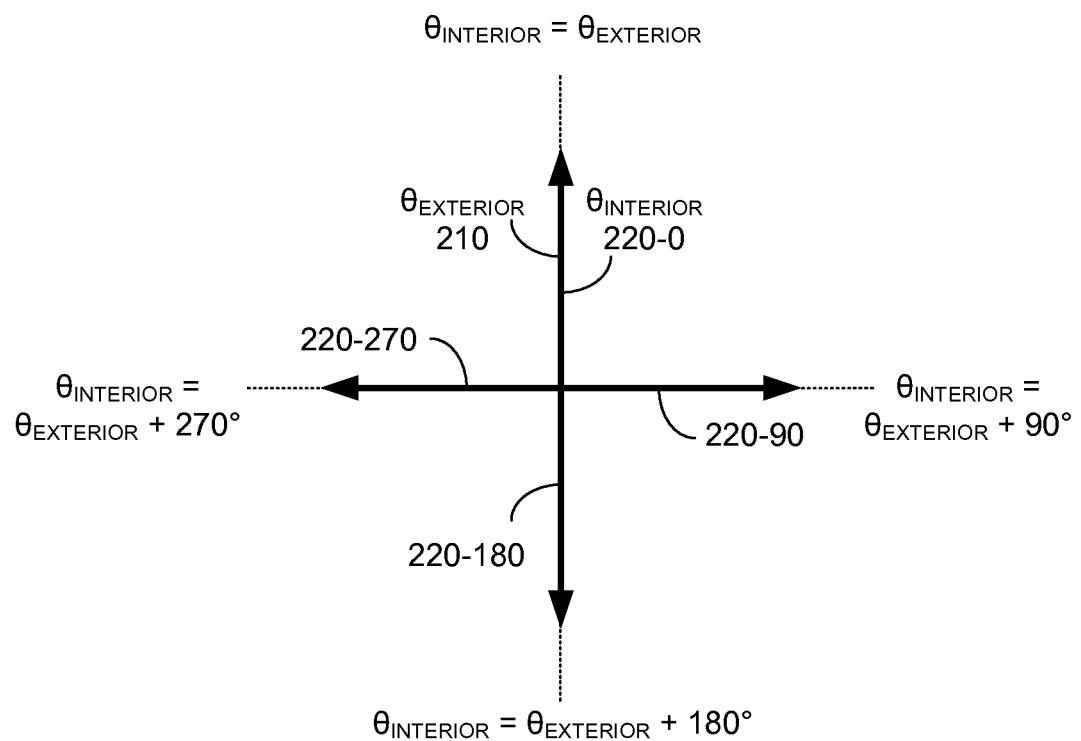
FIG. 16 shows a relationship between an exterior angle ($\theta_{EXTERIOR}$) and multiple interior angles ($\theta_{INTERIOR}$), in accordance with some embodiments of the present invention.

FIG. 16 shows a relationship between an exterior angle 210 ($\theta_{EXTERIOR}$) and multiple interior angles 220 ($\theta_{INTERIOR}$), in accordance with some embodiments of the present invention. Each interior angle 220 ($\theta_{INTERIOR}$) is assumed to be at an offset away from the exterior angle 210 ($\theta_{EXTERIOR}$) such that $\{\theta_{INTERIOR}=\theta_{EXTERIOR}+(n\times 90°)\}$, where n=0, 1, 2 or 3. A first interior angle 220-0 is shown at 0° in line with the exterior angle 210 ($\theta_{EXTERIOR}$). A second interior angle 220-90 is shown at 90°. A third interior angle 220-180 is shown at 180°. A fourth interior angle 220-270 is shown at 270°.

Figure 17:
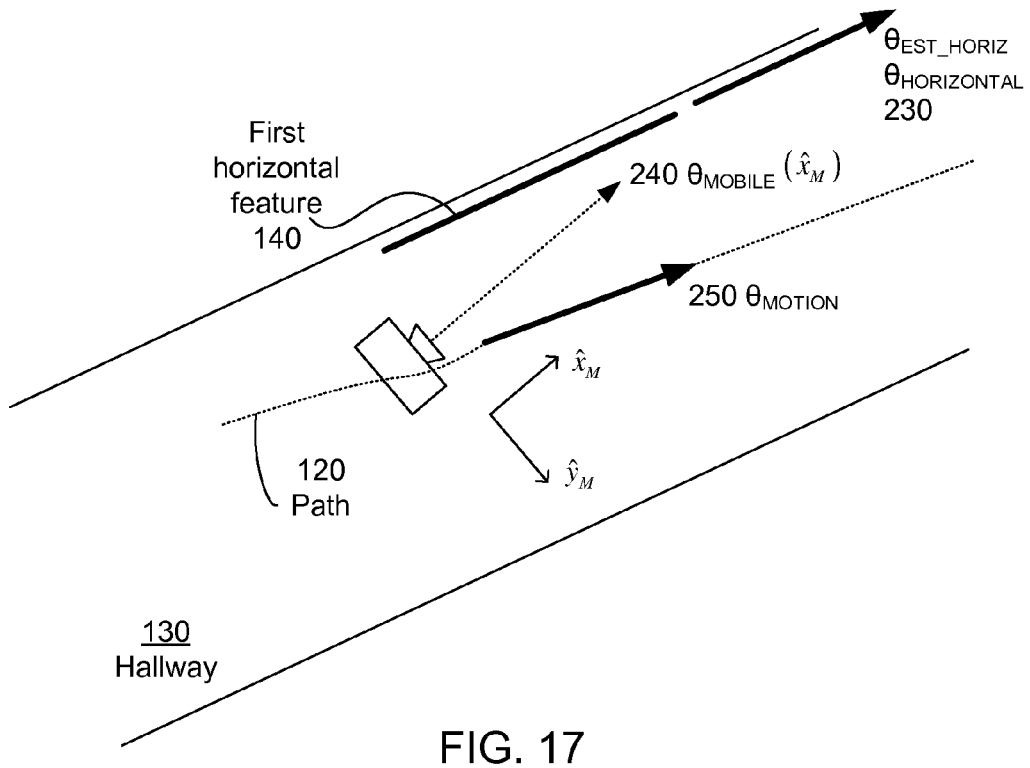
FIG. 17 shows an overhead view of a mobile device executing a wall matching algorithm in a hallway, in accordance with some embodiments of the present invention.

FIG. 17 shows an overhead view of a mobile device 100 executing a wall matching algorithm in a hallway, in accordance with some embodiments of the present invention. Several directions or angles are shown. A first direction is a mobile direction ($\theta_{MOBILE}$), which is the direction the mobile device 100 is oriented. The mobile direction ($\theta_{MOBILE}$) defines a center axis ($\hat{x}_M$) of the camera 320 and of the body of the mobile device 100. A second axis ($\hat{y}_M$) of the mobile device 100 is perpendicular to the center axis ($\hat{x}_M$) and is generally horizontal if the mobile device 100 is upright. A third axis ($\hat{z}_M$) (not shown) of the mobile device 100 is perpendicular to the center axis ($\hat{x}_M$) and the horizontal axis ($\hat{y}_M$), and is generally vertical if the mobile device 100 is upright. The three perpendicular axes ($\hat{x}_M$, $\hat{y}_M$, $\hat{z}_M$) define the body reference system of the mobile device 100 and are fixed with relation to the mobile device 100 but are variable with respect to building 110.

A second direction is a motion direction 250 ($\theta_{MOTION}$), which is the direction of motion along the path 120 of the mobile device 100. A third direction is a horizontal direction 230 ($\theta_{HORIZONTAL}$), which is the direction of a horizontal feature 140 in view of the camera 320. The horizontal direction 230 ($\theta_{HORIZONTAL}$) is assumed to be one of the interior angles 220 ($\theta_{INTERIOR}$). The horizontal feature 140 may be a top of a doorway, a bottom or top of a closed door, a bottom or top edge of a hallway 130, a bottom or top of a picture frame, a sign or name plate, a horizontal handrail, or similar horizontal feature 140. The path 120 is shown within a hallway 130 (for example, a person may be walking down the hallway 130).

If in motion, the motion direction 250 ($\theta_{MOTION}$) may be generally in line with the horizontal direction 230 ($\theta_{HORIZONTAL}$), which may be assumed to be parallel or perpendicular to the exterior angle 210 ($\theta_{EXTERIOR}$). Thus, an inertial sensor 332 may be used to measure and accumulate the motion direction 250 ($\theta_{MOTION}$), and a camera 320 may use image processing to search for a horizontal feature 140 and compute the horizontal direction 230 ($\theta_{HORIZONTAL}$). For example, an accelerometer 334 may be used with a dead reckoning method. A current motion direction 250 ($\theta_{MOTION}$) along path 120 may be mapped, constrained or restricted to a parallel/perpendicular direction as discussed above.

Figure 18:
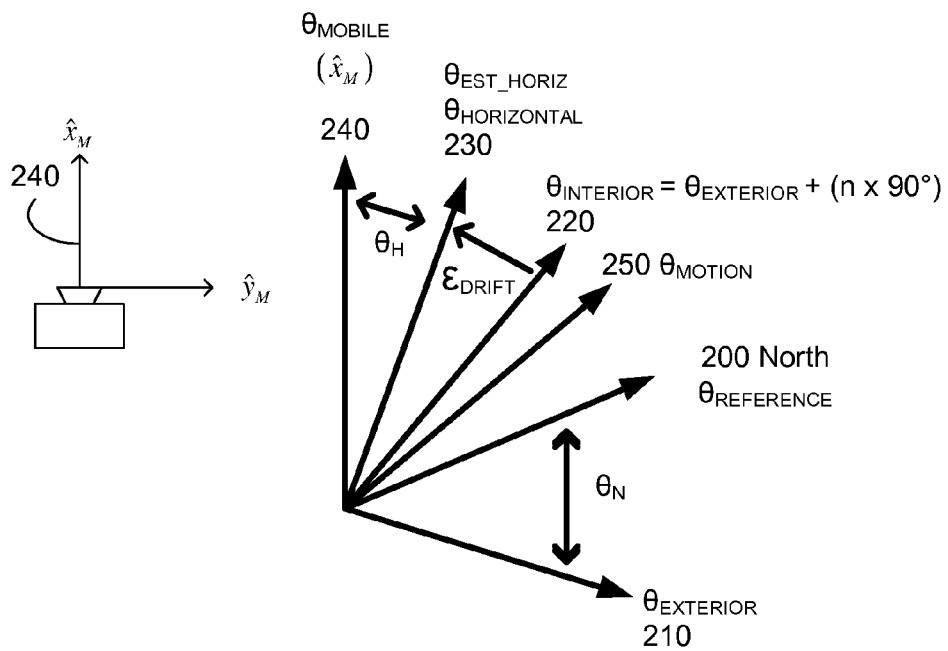
FIGS. 18 and 19 illustrate various vectors, in accordance with some embodiments of the present invention.
Figure 19:
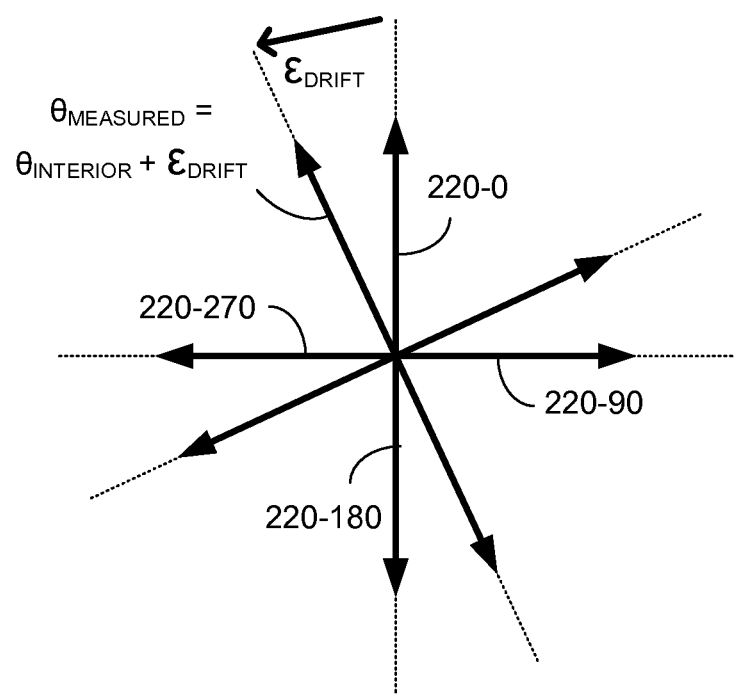

FIGS. 18 and 19 illustrate various vectors, in accordance with some embodiments of the present invention. In FIG. 18, a first vector is a reference direction ($\theta_{REFERENCE}$) such as a Cardinal direction (e.g., magnetic North or true North, referred to as North 200). A second vector is the exterior angle 210 ($\theta_{EXTERIOR}$), which follows along one of the exterior walls of building 110. An angle $\theta_N$ is defined as the angle formed between the reference direction ($\theta_{REFERENCE}$) and the exterior angle 210 ($\theta_{EXTERIOR}$). Often, the exterior angle 210 ($\theta_{EXTERIOR}$) may be determined by an observation made just before entering a building 110. The exterior angle 210 ($\theta_{EXTERIOR}$) may be computed from a camera image by image processing or from a lookup table in a table on the mobile device 100 or a server. Alternatively, a position estimate may indicate a closest building 110 and a lookup table may contain an exterior angle 210 ($\theta_{EXTERIOR}$) for that building 110.

In FIG. 19, using a rough angle provided by the sensors 330 results a measured angle ($\theta_{MEASURED}$) that differs from the interior angles 220 ($\theta_{INTERIOR}$) of interior wall directions. The difference may be represented as a sensor drift ($\epsilon_{DRIFT}$). Here, the figure shows interior angles 220 ($\theta_{INTERIOR}$) of 220-0 (at 0°+$\theta_{EXTERIOR}$), 220-90 (at 90°+$\theta_{EXTERIOR}$), 220-180 (at 180°+$\theta_{EXTERIOR}$), and 220-270 (at 270°+$\theta_{EXTERIOR}$). Because of the sensor drift ($\epsilon_{DRIFT}$), the sensor 330 provides an angle that is off but could be corrected if mapped to an interior wall, which is used to determine an error in the sensor 330.

A third vector is mobile orientation 240 ($\theta_{MOBILE}$), which is the direction the mobile device 100 is oriented, as explained above. A fourth vector is the horizontal direction 230 ($\theta_{HORIZONTAL}$), which is assumed to be one of four angles parallel and perpendicular to the exterior angle 210 ($\theta_{EXTERIOR}$). That is, the horizontal direction 230 ($\theta_{HORIZONTAL}$) is mapped to one of $\{\theta_{EXTERIOR}, \theta_{EXTERIOR}+90°, \theta_{EXTERIOR}+180°, \theta_{EXTERIOR}+270°\}$. A fifth vector is an estimated horizontal direction ($\theta_{EST\_HORIZ}$), which should be equal to the horizontal direction 230 ($\theta_{HORIZONTAL}$) but because of slight image processing errors, table error and/or faulty assumptions, the estimated horizontal direction ($\theta_{EST\_HORIZ}$) may not be exactly equal to the horizontal direction 230 ($\theta_{HORIZONTAL}$).

Figure 20:
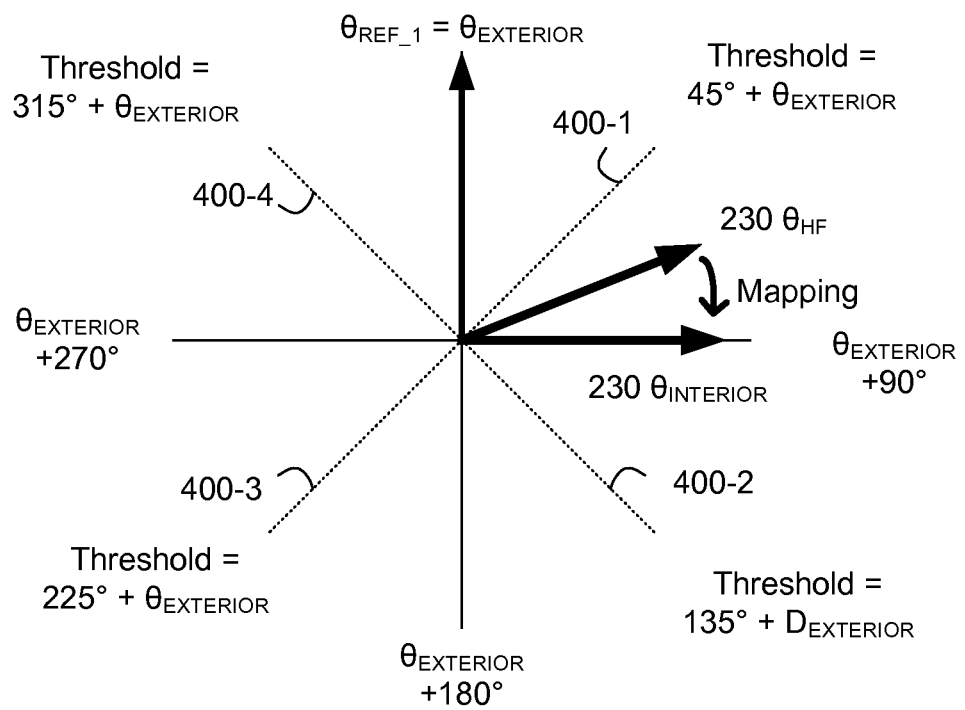
FIGS. 20, 21 and 22 illustrate wall matching, in accordance with some embodiments of the present invention.
Figures 21, 22:
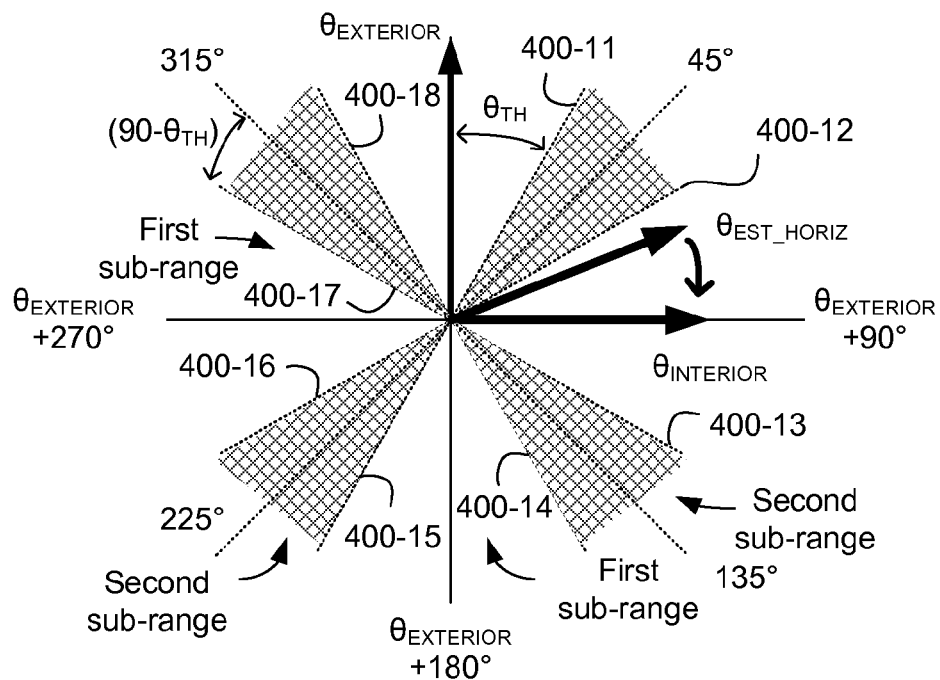

FIGS. 20, 21 and 22 illustrate wall matching, in accordance with some embodiments of the present invention. In FIG. 20, four divisions are shown at $\{\theta_{EXTERIOR}+45°, \theta_{EXTERIOR}+135°, \theta_{EXTERIOR}+225°, \theta_{EXTERIOR}+315°\}$. Herein, a given direction angle β is equivalent to and assumed reduced to (β mod 360°).

A mobile device 100 may adjust accumulated drift in a rough measured direction ($\theta_{MEASURED}$), which is assumed to include accumulated error away from a perpendicular or parallel exterior wall, by adjusting the direction ($\theta_{ADJUSTED}$) to a direction that is closest to $\{\theta_{EXTERIOR}, \theta_{EXTERIOR}+90°, \theta_{EXTERIOR}+180°, \theta_{EXTERIOR}+270°\}$. Therefore, the measured direction ($\theta_{MEASURED}$) is an input parameter and the adjusted direction ($\theta_{ADJUSTED}$) is an output parameter. For example, if a measured direction ($\theta_{MEASURED}$) is in between two adjoining thresholds, then the measured direction ($\theta_{MEASURED}$) is mapped as the adjusted direction ($\theta_{ADJUSTED}$) to be parallel or perpendicular to the exterior angle 210 ($\theta_{EXTERIOR}$). That is, if $\{\theta_{EXTERIOR}+45°<\theta_{MEASURED}<\theta_{EXTERIOR}+135°\}$ then $\{\theta_{ADJUSTED}=\theta_{EXTERIOR}+90°\}$. If $\{\theta_{EXTERIOR}+135°<\theta_{MEASURED}<\theta_{EXTERIOR}+225°\}$ then $\{\theta_{ADJUSTED}=\theta_{EXTERIOR}+180°\}$. If $\{\theta_{EXTERIOR}+225°<\theta_{MEASURED}<\theta_{EXTERIOR}+315°\}$ then $\{\theta_{ADJUSTED}=\theta_{EXTERIOR}+270°\}$. If $\{\theta_{EXTERIOR}+315°<\theta_{MEASURED}<\theta_{EXTERIOR}+45°\}$ $\{\theta_{ADJUSTED}=\theta_{EXTERIOR}\}$. In this case, a full range of input parameters (measured direction, $\theta_{MEASURED}$) are mapped to one of four output parameters (adjusted direction, $\{\theta_{ADJUSTED}=D_{EXTERIOR}+(n\times 90°)\}$, where n=0, 1, 2, 3).

In FIG. 21, a first sub-range of measured directions ($\theta_{MEASURED}$) are mapped and a remaining second sub-range of measured directions ($\theta_{MEASURED}$) are left unmapped. The first sub-range comprises angles close to one of the four parallel/perpendicular exterior angle 210 ($\theta_{EXTERIOR}$) ($\theta_{EXTERIOR}$+n*90°). The second sub-range (shown as the hashed areas) comprises angles that are far from any of the four parallel/perpendicular exterior angle 210 ($\theta_{EXTERIOR}$) ($\theta_{EXTERIOR}$+n*90°).

A measured direction ($\theta_{MEASURED}$) is close if it is within an angle θ from an of the four parallel/perpendicular exterior angle 210 ($\theta_{EXTERIOR}$) ($\theta_{EXTERIOR}$+n*90°). That is, if ($\theta_{EXTERIOR}$+45°+θ<$\theta_{MEASURED}$<$\theta_{EXTERIOR}$+135°−θ) then ($\theta_{ADJUSTED}$=$\theta_{EXTERIOR}$+90°). If ($\theta_{EXTERIOR}$+135°+θ<$\theta_{MEASURED}$<$\theta_{EXTERIOR}$+225°−θ) then ($\theta_{ADJUSTED}$=$\theta_{EXTERIOR}$+180°). If ($\theta_{EXTERIOR}$+225°+θ<$\theta_{MEASURED}$<$\theta_{EXTERIOR}$+315°−θ) then ($\theta_{ADJUSTED}$=$\theta_{EXTERIOR}$+270°). If ($\theta_{EXTERIOR}$+315°+θ<$\theta_{MEASURED}$<$\theta_{EXTERIOR}$+45°−θ) then ($\theta_{ADJUSTED}$=$\theta_{EXTERIOR}$). In this case, only this first sub-range of input parameters (measured direction, $\theta_{MEASURED}$) is mapped to one of four output parameters (adjusted direction, $\theta_{ADJUSTED}$={$D_{EXTERIOR}$+n*90°}, where n=0, 1, 2, 3).

If a measured direction ($\theta_{MEASURED}$) is outside the first sub-range it is inside the second sub-range. The second sub-range of values for the measured direction ($\theta_{MEASURED}$) is not mapped when the measured direction ($\theta_{MEASURED}$) is outside of the angle θ from all of the four parallel/perpendicular exterior angle 210 ($\theta_{EXTERIOR}$) ($\theta_{EXTERIOR}$+n*90°). That is, when ($\theta_{EXTERIOR}$+135°−θ<$\theta_{MEASURED}$<$\theta_{EXTERIOR}$+135°−θ) or ($\theta_{EXTERIOR}$+225°−θ<$\theta_{MEASURED}$<$\theta_{EXTERIOR}$+225°−θ) or ($\theta_{EXTERIOR}$+315°−θ<$\theta_{MEASURED}$<$\theta_{EXTERIOR}$+315°−θ) or ($\theta_{EXTERIOR}$+45°−θ<$\theta_{MEASURED}$<$\theta_{EXTERIOR}$+45°−θ), the measured direction ($\theta_{MEASURED}$) is not mapped. Therefore, only a measured direction ($\theta_{MEASURED}$) close to a direction of a parallel/perpendicular wall ($\theta_{EXTERIOR}$+n*90°) is mapped.

FIG. 22 shows various thresholds in table form. The angle $\theta_{TH}$ may be set to 45° to result in the thresholds shown in FIG. 20. Alternatively, this angle $\theta_{TH}$ may be set to a value much larger than 0° and up to 45° to result in the thresholds and two sub-ranges as shown in FIG. 21. The angle $\theta_{TH}$ may be set to any appropriate value, such as 20°, 25°, 30°, 40° or 45°.

Figure 23:
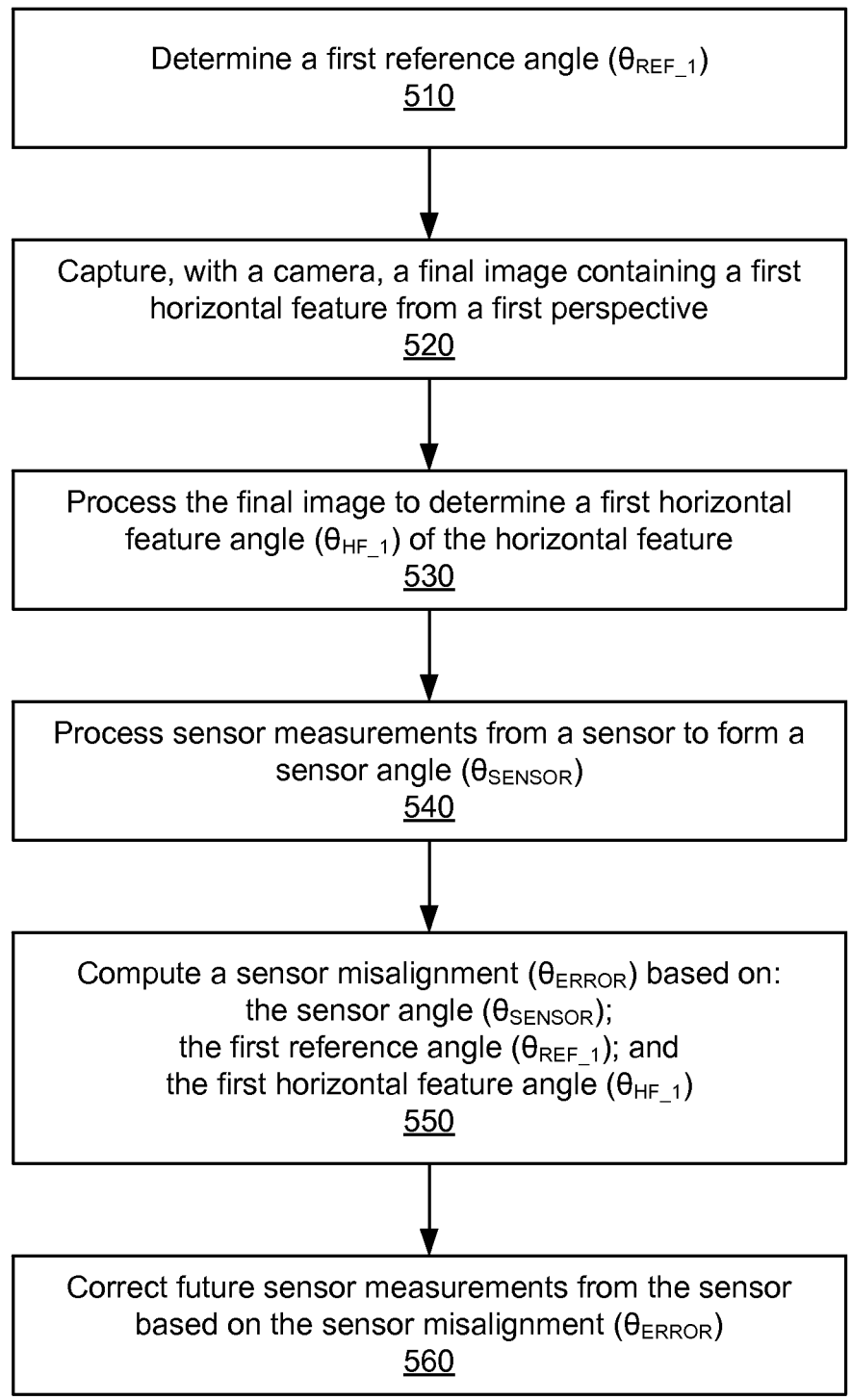
FIG. 23 is a flow diagram of a method in a mobile device, in accordance with some embodiments of the present invention.

FIG. 23 is a flow diagram of a method in a mobile device 100, in accordance with some embodiments of the present invention. At 510, the processor 310 determines a first reference angle 350 ($\theta_{REF\_1}$). At 520, the processor 310 captures, with a camera, a final image containing a horizontal feature 140 from a first perspective. At 530, the processor 310 processes the final image to determine a first horizontal feature angle 355 ($\theta_{HF\_1}$) of the horizontal feature 140. At 540, the processor 310 processes sensor measurements from a sensor 330 to form a sensor angle 365 ($\theta_{SENSOR}$). At 550, the processor 310 computes a sensor misalignment 370 ($\theta_{ERROR}$) based on: the sensor angle 365 ($\theta_{SENSOR}$); the first reference angle 350 ($\theta_{REF\_1}$); and the first horizontal feature angle 355 ($\theta_{HF\_1}$). At 560, the processor 310 corrects future sensor measurements from the sensor 330 based on the sensor misalignment 370 ($\theta_{ERROR}$).

Embodiments above are described with relation to parallel and perpendicular exterior and interior walls. That is, embodiments are applied to four-side buildings with square and rectangular footprints and floor plans (i.e., wherein exterior and interior walls form respective angles of n*360/4° where n={0, 1, 2, 3}). Embodiments may be equally applied to multi-sided buildings having all square corners (e.g., an L' shaped building). In such buildings, exterior walls are still parallel and perpendicular to one another. Embodiments are equally applicable and may be adjusted accordingly when walls are not all square but rather form other angles (e.g., having an equilateral triangle footprint, a right triangle footprint, a pentagon footprint). For example, a building 110 having an equilateral triangle footprint would constrain angles to n*360/3° where n={0, 1, 2}. A building 110 having a square triangle footprint could constrain angles to {0, 45, 90, ... }. A building 110 having a pentagon footprint would constrain angles to n*360/5° where n={0, 1, 2, 3, 4}.

Embodiments above are described with relation to determining a reference angle or horizontal feature angle based on an orientation of an interior wall and an assumption that exterior walls and interior walls are parallel or perpendicular. Embodiments are equally applicable to exterior walls alone. That is, an interior wall may be substituted with an exterior wall. Therefore, a mobile device 100 may compute a horizontal feature angle based on an image containing a horizontal feature on an exterior wall. In this manner, a mobile device 100 may: (1) take one or two images of one or two horizontal features on one or two exterior walls; (2) compute an optically based relative or absolute angle; (3) compare this angle to a sensor based relative or absolute angle; and (4) form a sensor misalignment 370 ($\theta_{ERROR}$) based on the comparison.

The methodologies described herein may be implemented by various means depending upon the application. For example, these methodologies may be implemented in hardware, firmware, software, or any combination thereof. For a hardware implementation, the processing units or processor 310 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method of navigation in a mobile device using a reference wall, the method comprising:
   determining a reference angle ($\theta_{REF}$) of the reference wall, comprising:
      determining a building containing the reference wall;
      finding the building on an overhead map; and
      computing the reference angle ($\theta_{REF}$) from the overhead map;
   capturing, with a camera in the mobile device, a local image containing a horizontal feature;
   processing the local image to determine a horizontal feature angle ($\theta_{HF}$), wherein the horizontal feature angle ($\theta_{HF}$) measures an angle from a current orientation of the mobile device to the horizontal feature;
   selecting a wall angle, of the horizontal feature, equal to an integer multiple of 90° from the reference angle ($\theta_{REF}$); and
   determining an angle of the current orientation of the mobile device based on a combination of the horizontal feature angle ($\theta_{HF}$) and the wall angle.

2. The method of claim 1, wherein the reference angle ($\theta_{REF}$) is an absolute angle with respect to North.

3. The method of claim 1, wherein the reference wall is an exterior wall.

4. The method of claim 1, wherein the local image comprises an interior wall.

5. The method of claim 1, wherein determining the reference angle ($\theta_{REF}$) further comprises:
   capturing an initial image;
   wherein computing the reference angle ($\theta_{REF}$) is based on the initial image.

6. The method of claim 1, wherein the horizontal feature comprises a horizontal edge of a door frame.

7. The method of claim 1, wherein the horizontal feature comprises a horizontal edge of a window.

8. The method of claim 1, wherein the horizontal feature comprises an interface edge between a wall and one of a floor and a ceiling.

9. The method of claim 1, wherein the wall angle is a modulo of {the reference angle ($\theta_{REF}$)+n*90°, 360°}, wherein n is an integer.

10. The method of claim 9, wherein the n is 0.

11. The method of claim 9, wherein the n is −1.

12. The method of claim 1, wherein selecting the wall angle is based on inertial sensor measurements.

13. The method of claim 12, further comprising calibrating an inertial sensor.

14. The method of claim 13, wherein calibrating the inertial sensor comprises:
   deriving a sensor misalignment ($\theta_{ERROR}$) based on:
      a current orientation ($\theta_{SENSOR}$) of the mobile device based on the inertial sensor measurements from the inertial sensor; and
      the angle of the current orientation of the mobile device; and
   calibrating the inertial sensor based on the sensor misalignment ($\theta_{ERROR}$).

15. The method of claim 1, further comprising determining a position of the mobile device based on the angle of the current orientation of the mobile device.

16. The method of claim 1, further comprising determining motion of the mobile device based on the angle of the current orientation of the mobile device.

17. The method of claim 1, further comprising setting a direction of motion of the mobile device to the wall angle to perform wall matching.

18. The method of claim 1,
   wherein the building is indexed in a database, and further comprising:
   looking up the reference angle ($\theta_{REF}$) from the database.

19. A mobile device for navigation using a reference wall, the mobile device comprising:
   a camera;
   an inertial sensor; and
   a processor and memory comprising code for:
      determining a reference angle ($\theta_{REF}$) of the reference wall, comprising:
         determining a building containing the reference wall;
         finding the building on an overhead map; and
         computing the reference angle ($\theta_{REF}$) from the overhead map;
      capturing, with the camera in the mobile device, a local image containing a horizontal feature;
      processing the local image to determine a horizontal feature angle ($\theta_{HF}$), wherein the horizontal feature angle ($\theta_{HF}$) measures an angle from a current orientation of the mobile device to the horizontal feature;
      selecting a wall angle, of the horizontal feature, equal to an integer multiple of 90° from the reference angle ($\theta_{REF}$); and
      determining an angle of the current orientation of the mobile device based on a combination of the horizontal feature angle ($\theta_{HF}$) and the wall angle.

20. A mobile device for navigation using a reference wall, the mobile device comprising:
   means for determining a reference angle ($\theta_{REF}$) of the reference wall, comprising:
      means for determining a building containing the reference wall;
      means for finding the building on an overhead map; and
      means for computing the reference angle ($\theta_{REF}$) from the overhead map;
   means for capturing a local image containing a horizontal feature;
   means for processing the local image to determine a horizontal feature angle ($\theta_{HF}$), wherein the horizontal feature angle ($\theta_{HF}$) measures an angle from a current orientation of the mobile device to the horizontal feature;

means for selecting a wall angle, of the horizontal feature, equal to an integer multiple of 90° from the reference angle ($\theta_{REF}$); and means for determining an angle of the current orientation of the mobile device based on a combination of the horizontal feature angle ($\theta_{HF}$) and the wall angle.

21. A non-transient computer-readable storage medium including program code stored thereon, for navigation using a reference wall, comprising program code for:

determining a reference angle ($\theta_{REF}$) of the reference wall, comprising:

determining a building containing the reference wall;

finding the building on an overhead map; and computing the reference angle ($\theta_{REF}$) from the overhead map;

receiving, from a camera in the mobile device, a local image containing a horizontal feature;

processing the local image to determine a horizontal feature angle ($\theta_{HF}$), wherein the horizontal feature angle ($\theta_{HF}$) measures an angle from a current orientation of the mobile device to the horizontal feature;

selecting a wall angle, of the horizontal feature, equal to an integer multiple of 90° from the reference angle ($\theta_{REF}$); and determining an angle of the current orientation of the mobile device based on a combination of the horizontal feature angle ($\theta_{HF}$) and the wall angle.

* * * * *